United States Patent
Pal et al.

(10) Patent No.: US 9,778,676 B2
(45) Date of Patent: Oct. 3, 2017

(54) POWER DISTRIBUTION NETWORK (PDN) DROOP/OVERSHOOT MITIGATION IN DYNAMIC FREQUENCY SCALING

(71) Applicant: QUALCOMM Incorporated, San Diego, CA (US)

(72) Inventors: Dipti Ranjan Pal, Irvine, CA (US); Mohamed Waleed Allam, Rancho Santa Fe, CA (US); Ingyeom Kim, San Diego, CA (US); Paul Ivan Penzes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/817,057

(22) Filed: Aug. 3, 2015

(65) Prior Publication Data
US 2017/0038789 A1 Feb. 9, 2017

(51) Int. Cl.
*G06F 1/00* (2006.01)
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
None
See application file for complete search history.

(56) References Cited

U.S. PATENT DOCUMENTS

| | | | |
|---|---|---|---|
| 4,580,282 A | 4/1986 | Lawton et al. | |
| 4,780,890 A | 10/1988 | Kane | |
| 5,790,609 A | 8/1998 | Swoboda | |
| 6,490,329 B2 | 12/2002 | Nguyen et al. | |
| 7,282,969 B2 | 10/2007 | Shin et al. | |
| 7,404,099 B2 | 7/2008 | Huang | |
| 8,132,041 B2 | 3/2012 | Komninakis et al. | |
| 8,350,595 B2 | 1/2013 | Kanno et al. | |
| 8,450,990 B2 | 5/2013 | Shi et al. | |
| 8,631,262 B2 | 1/2014 | Park | |
| 8,729,947 B2 | 5/2014 | Hwang et al. | |

(Continued)

FOREIGN PATENT DOCUMENTS

| JP | 200401382 A | 1/2004 |
|---|---|---|
| JP | 2005122374 A | 5/2005 |

(Continued)

OTHER PUBLICATIONS

International Search Report and Written Opinion—PCT/US2016/040797—ISA/EPO—Sep. 19, 2016.
Co-pending U.S. Appl. No. 14/300,084, filed Jun. 9, 2014.

*Primary Examiner* — Nitin Patel
(74) *Attorney, Agent, or Firm* — Loza & Loza, LLP/Qualcomm

(57) ABSTRACT

Systems and methods for power distribution network (PDN) droop/overshoot mitigation are provided. In certain embodiments, overshoot is mitigated by ramping down a frequency of a clock signal to a processor when the processor is switching clock frequencies and/or the processor is transitioning from an active mode to an idle mode. In certain embodiments, droop is mitigated by ramping up a frequency of a clock signal to a processor when the processor is switching clock frequencies and/or the processor is transitioning from an idle mode to an active mode.

26 Claims, 14 Drawing Sheets

(56) References Cited

U.S. PATENT DOCUMENTS

| | | | |
|---|---|---|---|
| 8,885,531 B1* | 11/2014 | Gong | H04W 52/0206 370/235 |
| 9,582,027 B2 | 2/2017 | Coutts et al. | |
| 2004/0064752 A1 | 4/2004 | Kazachinsky et al. | |
| 2005/0083098 A1 | 4/2005 | Matsui et al. | |
| 2009/0164827 A1 | 6/2009 | Komninakis et al. | |
| 2010/0332909 A1* | 12/2010 | Larson | G06F 11/3476 714/40 |
| 2012/0187991 A1 | 7/2012 | Sathe et al. | |
| 2013/0127550 A1* | 5/2013 | Sutardja | H03K 3/02 331/57 |
| 2013/0219199 A1* | 8/2013 | Roy | G06F 1/324 713/322 |
| 2014/0117959 A1 | 5/2014 | Costa | |
| 2014/0254734 A1 | 9/2014 | Abdelmoneum et al. | |
| 2015/0002197 A1 | 1/2015 | Chatterjee et al. | |
| 2016/0232008 A1* | 8/2016 | Luedeke | G06F 1/24 |

FOREIGN PATENT DOCUMENTS

| | | |
|---|---|---|
| JP | 2012141730 A | 7/2012 |
| WO | 0026747 | 5/2000 |
| WO | WO-03073244 A2 | 9/2003 |

* cited by examiner

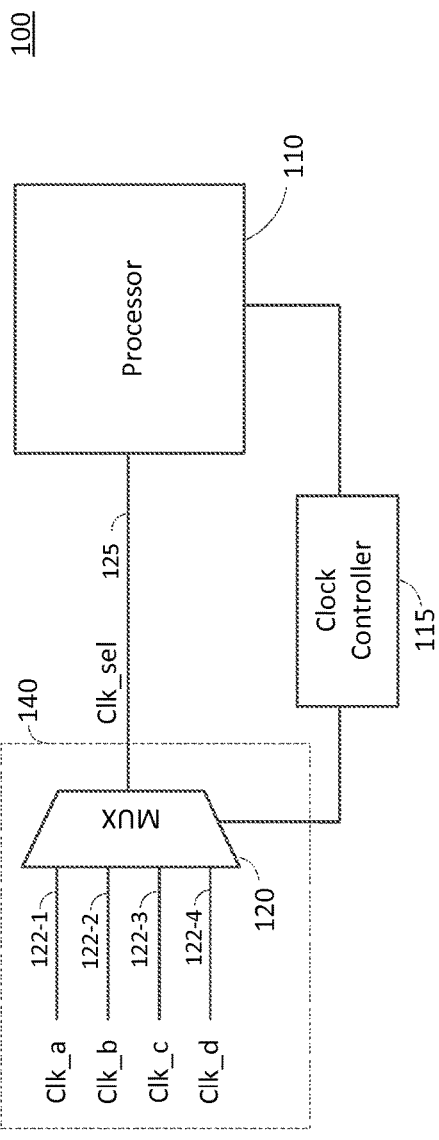
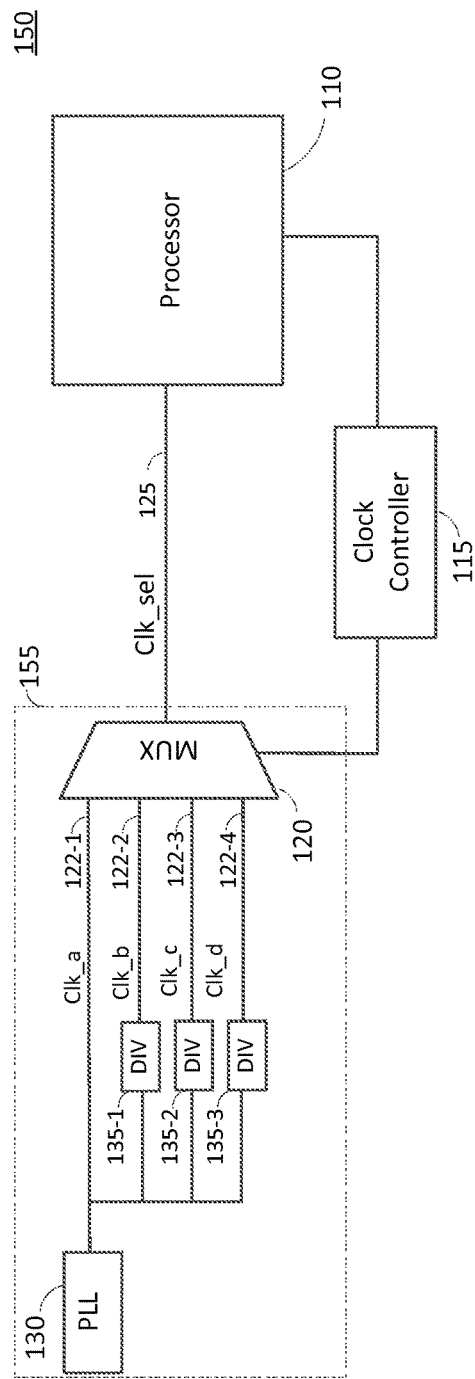
FIG. 1A
FIG. 1B

POWER DISTRIBUTION NETWORK (PDN) DROOP/OVERSHOOT MITIGATION IN DYNAMIC FREQUENCY SCALING

BACKGROUND

Field

Aspects of the present disclosure relate generally to power distribution networks (PDNs), and more particularly, to PDN droop/overshoot mitigation.

Background

Dynamic frequency scaling is widely used to dynamically change the clock frequency of a processor based on use cases. For example, the clock frequency of the processor may be increased when the processor is being used for a high-speed application, and may be reduced when the processor is being used for a low-speed application to conserve power.

SUMMARY

The following presents a simplified summary of one or more embodiments to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a system is described herein. The system comprises a clock circuit configured to generate a first clock signal, and a frequency ramp circuit configured to receive the first clock signal from the clock circuit, to provide a second clock signal based on the first clock signal, and to adjust a frequency of the second clock signal. The system also comprises a clock controller configured to instruct the frequency ramp circuit to ramp down the frequency of the second clock signal.

A second aspect relates to a method for clock frequency switching. The method comprises ramping down a frequency of a second clock signal, wherein the second clock signal is provided from a first clock signal, disabling the second clock signal, and switching the first clock signal from a first clock frequency to a second clock frequency after the second clock signal is disabled. The method also comprises enabling the second clock signal after the first clock signal is switched to the second clock frequency, and ramping up the frequency of the second clock signal.

A third aspect relates to an apparatus for clock frequency switching. The apparatus comprises means for ramping down a frequency of a second clock signal, wherein the second clock signal is provided from a first clock signal, means for disabling the second clock signal, and means for switching the first clock signal from a first clock frequency to a second clock frequency after the second clock signal is disabled. The apparatus also comprises means for enabling the second clock signal after the first clock signal is switched to the second clock frequency, and means for ramping up the frequency of the second clock signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 1A shows an exemplary system with frequency scaling.

FIG. 1B shows an exemplary system comprising a phase locked loop (PLL) and frequency dividers.

DETAILED DESCRIPTION

Figure 1C:
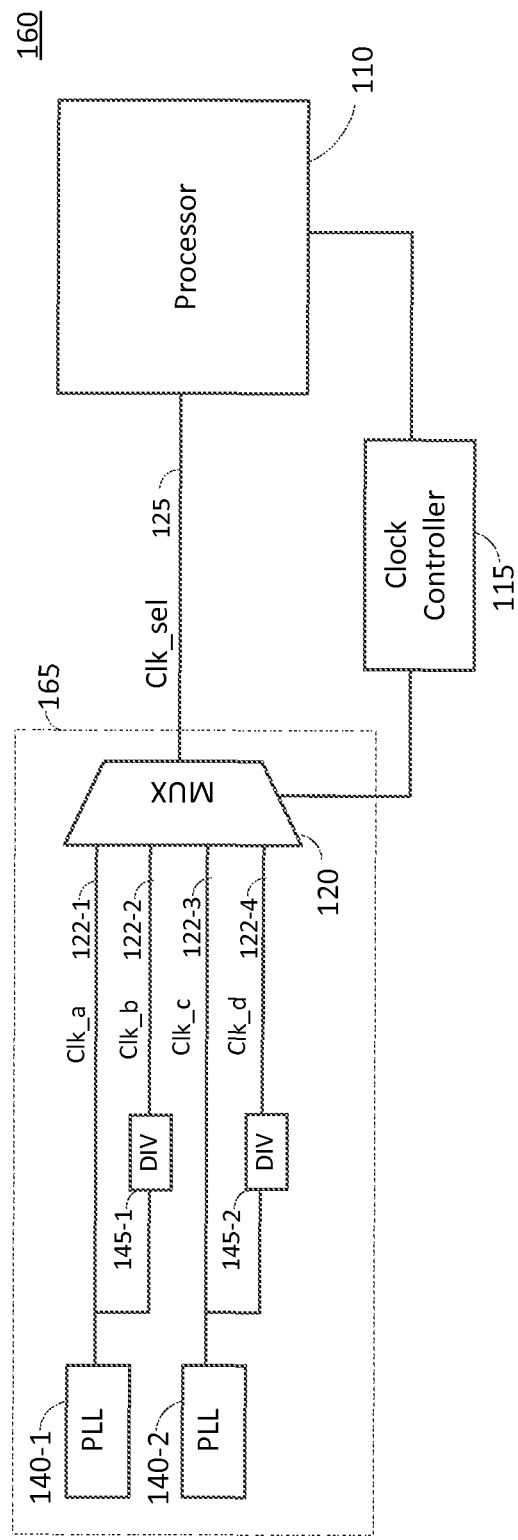
FIG. 1C shows an exemplary system comprising PLLs and frequency dividers.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Dynamic frequency scaling is widely used to dynamically change the clock frequency of a processor based on use cases. For example, the clock frequency of the processor may be increased when the processor is being used for a high-speed application, and may be reduced when the processor is being used for a low-speed application to conserve power.

FIG. 1A shows an example of a system 100 with dynamic frequency scaling. The system 100 comprises a processor (e.g., CPU, GPU, DSP, etc.) 110, a clock controller 115, and a clock circuit 140. The processor 110 may be powered by a power source via a power distribution network (PDN) (not shown). The power source may comprise a power management integrated circuit (PMIC) or another power source. Other circuits (e.g., one or more other processors) may also be coupled to the PDN.

The clock circuit 140 is configured to provide a clock signal (denoted "Clk_sel") to the processor 110, and to set the clock signal to any one of a plurality of selectable clock frequencies under the control of the clock controller 115, as discussed further below. In the example in FIG. 1A, the clock circuit 140 comprises a multiplexer 120 configured to receive a plurality of input clock signals Clk_a to Clk_d having different clock frequencies via clock lines 122-1 to 122-4, respectively, and to selectively output one of the input clock signals Clk_a to Clk_d to the processor 110 under the control of the controller 115. The multiplexer 120 outputs the selected clock signal Clk_sel to the processor 110 via a clock line 125.

The input clock signals Clk_a to Clk_d may be provided by a variety of clock sources. In this regard, FIG. 1B shows an example of a system 150 in which the clock circuit 155 comprises a phase locked loop (PLL) 130, and first, second and third frequency dividers 135-1, 135-2 and 135-3. In this example, input clock signal Clk_a is provided by the PLL 130. The PLL 130 may generate input clock signal Clk_a by multiplying the frequency of a reference clock signal from a crystal oscillator (not shown) by a certain amount. In the example in FIG. 1B, the first frequency divider 135-1 divides the frequency of input clock signal Clk_a by a first amount to generate input clock signal Clk_b, the second frequency divider 135-2 divides the frequency of input clock signal Clk_a by a second amount to generate input clock signal Clk_c, and the third frequency divider 135-3 divides the frequency of input clock signal Clk_a by a third amount to generate input clock signal Clk_d. In this example, input clock signal Clk_a is the highest-frequency clock signal.

FIG. 1C shows another example of a system 160 in which the clock circuit 165 comprises a first PLL 140-1, a second PLL 140-2, a first frequency divider 145-1, and a second frequency divider 145-2. In this example, input clock signal Clk_a is provided by the first PLL 140-1, and input clock signal Clk_c is provided by the second PLL 140-2. The first PLL 140-1 may generate input clock signal Clk_a by multiplying the frequency of a reference clock signal from a crystal oscillator (not shown) by a first amount, and the second PLL 140-2 may generate input clock signal Clk_c by multiplying the frequency of the reference clock signal by a second amount. In the example in FIG. 1C, the first frequency divider 145-1 divides the frequency of input clock signal Clk_a by a third amount to generate input clock signal Clk_b, and the second frequency divider 145-2 divides the frequency of input clock signal Clk_c by a fourth amount to generate input clock signal Clk_d. In this example, either input clock signal Clk_a or input clock signal Clk_c is the highest-frequency clock signal. The first and second frequency dividers may divide their respective clock signal by the same amount (e.g., divisor).

It is to be appreciated that the present disclosure is not limited to the examples shown in FIGS. 1B and 1C, and that the input clock signals Clk_a to Clk_d may be generated using any arrangement of PLLs, frequency dividers and/or other components. It is also to be appreciated that the multiplexer 120 may multiplex any number of input clock signals, and is therefore not limited to the example of four input clock signals shown in FIGS. 1A to 1C.

In operation, the multiplexer 120 selects one of the input clock signals Clk_a to Clk_d at a time, and outputs the selected clock signal Clk_sel to the processor 110 via the clock line 125. The processor 110 uses the selected clock signal Clk_sel to time switching operations in the processor 110. For example, logic gates (e.g., transistors) in the processor 110 may switch according to the frequency of the selected clock signal Clk_sel. The higher the frequency of the selected clock signal Clk_sel, the faster the switching of the logic gates in the processor 110, which translates into a faster processing speed.

The clock controller 115 is configured to dynamically change the clock frequency of the processor 110 based on use cases by changing the input clock signal selected by the multiplexer 120. For example, the processor 110 may determine a processing load of the processor 110, determine a clock frequency based on the determined processing load, and instruct the clock controller 115 to set the frequency of the clock signal Clk_sel according to the determined clock frequency. In this example, the processor 110 may instruct the clock controller 115 to change the clock frequency due to, for example, a change in processing loads. For instance, if the processor 110 launches an application requiring higher speed, then the processor 110 may instruct the clock controller 115 to switch to a higher clock frequency. Thus, the clock controller 115 may switch input clock signals based on the processing needs of the processor 110.

The multiplexer 120 may generate a glitch when the multiplexer 120 switches between two input clock signals, especially if the multiplexer 120 operates asynchronously with one or both of the clock signals. In this example, a glitch may be generated if the multiplexer 120 switches between the two input clock signals when one or both of the clock signals are high, resulting in chopping of one or both of the clock signals. To prevent glitches, the multiplexer 120 may be implemented using a glitch-free multiplexer.

Figure 2:
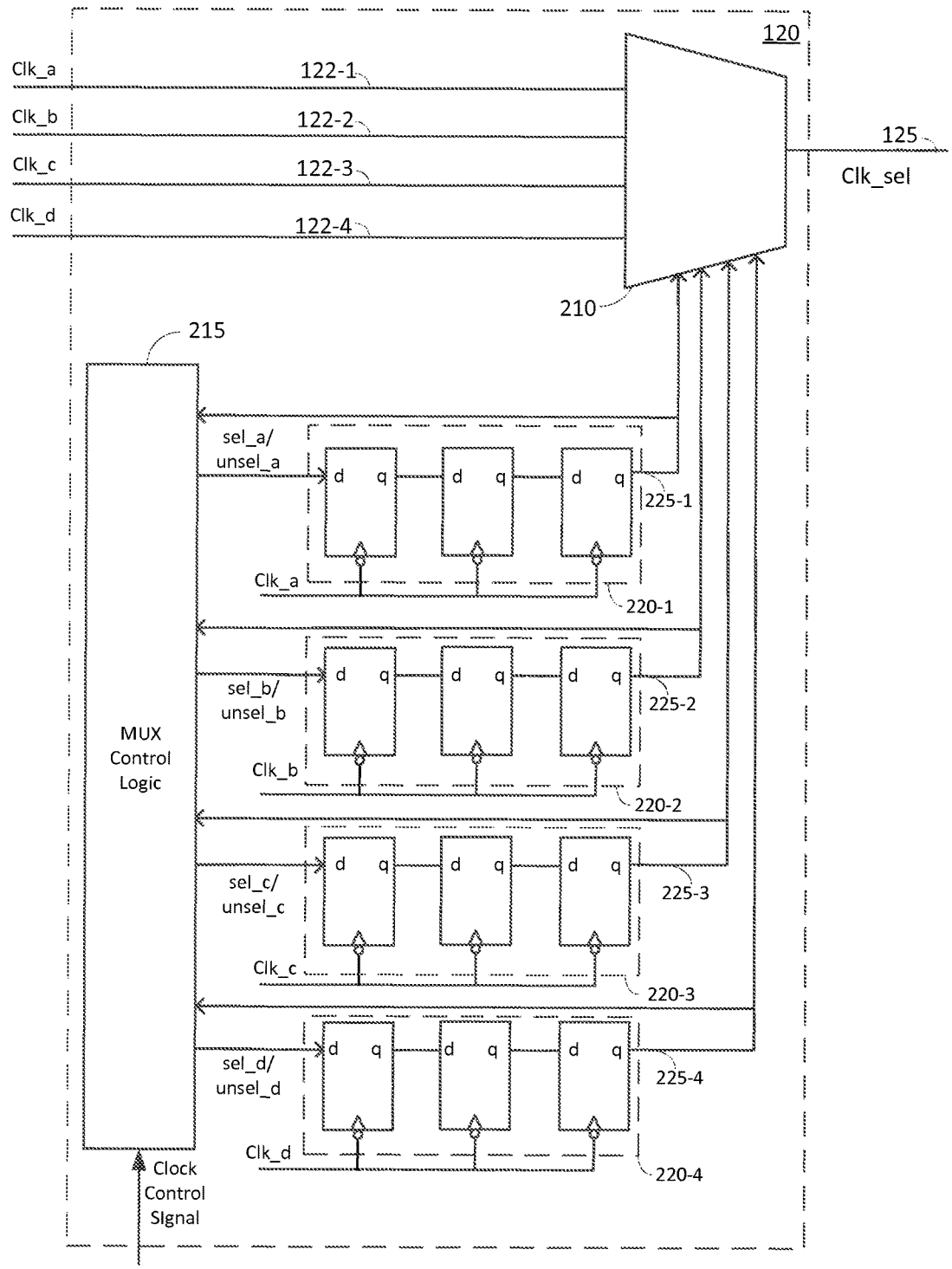
FIG. 2 shows an exemplary implementation of a glitch-free multiplexer.

In this regard, FIG. 2 shows an example of a glitch-free implementation of the multiplexer 120. In this example, the multiplexer 120 comprises a multiplexer 210, multiplexer control logic 215, a first synchronizer 220-1, a second synchronizer 220-2, a third synchronizer 220-3, and a fourth synchronizer 220-4. Each of the synchronizers 220-1 to 220-4 comprises three negative-edge-triggered flip-flops coupled in series, as shown in FIG. 2. The flip-flops in the first synchronizer 220-1 are clocked using clock signal Clk_a, the flip-flops in the second synchronizer 220-2 are clocked using clock signal Clk_b, the flip-flops in the third synchronizer 220-3 are clocked using clock signal Clk_c, and the flip-flops in the fourth synchronizer 220-4 are clocked using the clock signal Clk_d. Although not explicitly shown in FIG. 2, each synchronizer may be coupled to the clock line of the respective clock signal to receive the respective clock signal.

The control logic 215 is configured to select one of the input clock signals Clk_a to Clk_d and unselect the remaining input clock signals Clk_a to Clk_d. To do this, the control logic 215 outputs a select/unselect signal for each of the input clock signals Clk_a to Clk_d to the multiplexer 210 via a respective one of the synchronizers 220-1 to 220-4. More particularly, the control logic 215 outputs a select/unselect signal (denoted "sel_a/unsel_a") for input clock signal Clk_a via the first synchronizer 220-1, outputs a select/unselect signal (denoted "sel_b/unsel_b") for input clock signal Clk_b via the second synchronizer 220-2, outputs a select/unselect signal (denoted "sel_c/unsel_c")

for input clock signal Clk_c via the third synchronizer 220-3, and outputs a select/unselect (denoted "sel_d/unsel_d") for input clock signal Clk_d via the fourth synchronizer 220-4. When the multiplexer 210 receives a select signal for an input clock signal, the multiplexer 210 outputs the input clock signal to the processor 110. When the multiplexer 210 receives an unselect signal for an input clock signal, the multiplexer 210 disables output of the input clock signal. In this example, a select signal may correspond to logic one and an unselect signal may correspond to logic zero, or vice versa.

At a given time, the control logic 215 may output a select signal for a selected one of the inputs clock signals and output unselect signals for the remaining unselected clock signals. In this regard, the control logic 215 may receive a clock control signal from the controller 115 indicating which input clock signal to select. In response, the control logic 215 may output a select signal for the input clock signal indicated by the control signal, and output unselect signals for the remaining input clock signals.

In one aspect, the output 225-1 to 225-4 of each of the synchronizers 220-1 to 220-4 is fed back to the control logic 215, as shown in FIG. 2. This allows the control logic 215 to determine when the multiplexer 210 stops outputting a clock signal during clock switching, as discussed further below.

To switch the output of the multiplexer 210 from a current one of the input clock signals Clk_a to Clk_d to a new one of the input clock signals Clk_a to Clk_d, the control logic 215 may first disable output of the current input clock signal by outputting an unselect signal for the current clock signal. The unselect signal propagates through the respective synchronizer, which outputs the unselect signal to the multiplexer 210. The respective synchronizer synchronizes the output of the unselect signal with the current input clock signal such that the unselect signal is output to the multiplexer 210 when the current input clock signal is low. This is because the flip-flops in the respective synchronizer are negative-edge triggered. As a result, the multiplexer 210 disables output of the current input clock signal when the current input clock signal is low, thereby preventing glitch. At this point, all of the input clock signals are unselected, and the multiplexer 120 stops outputting a clock signal to the processor 110.

The unselect signal output by the respective synchronizer is fed back to the control logic 215, indicating to the control logic 215 that output of the current input clock signal has been disabled at the multiplexer 210. In response, the control logic 215 outputs a select signal for the new input clock signal. The select signal propagates through the respective synchronizer, which outputs the select signal to the multiplexer 210. The respective synchronizer synchronizes the output of the select signal with the new input clock signal such that the select signal is output to the multiplexer 210 when the new input clock signal is low. This is because the flip-flops in the respective synchronizer are negative-edge triggered. As a result, the multiplexer 210 enables output of the new input clock signal when the new input clock signal is low, thereby preventing glitch.

In the above example, there is an idle period between the time that output of the current clock signal is disabled at the multiplexer 210 and the time that output of the new clock signal is enabled at the multiplexer 210. During the idle period, the multiplexer 210 does not output a clock signal to the processor 110. The idle period may be approximately equal to the propagation delay of the synchronizer used to synchronize the select signal for the new clock signal with the new clock signal. In the example in FIG. 2, the idle period may span at least three cycles of the new clock signal since the select signal for the new clock signal has to propagate through three flip-flops in the respective synchronizer to reach the multiplexer 210. The idle period may also be referred to as a dead period or other terminology.

Figure 3:
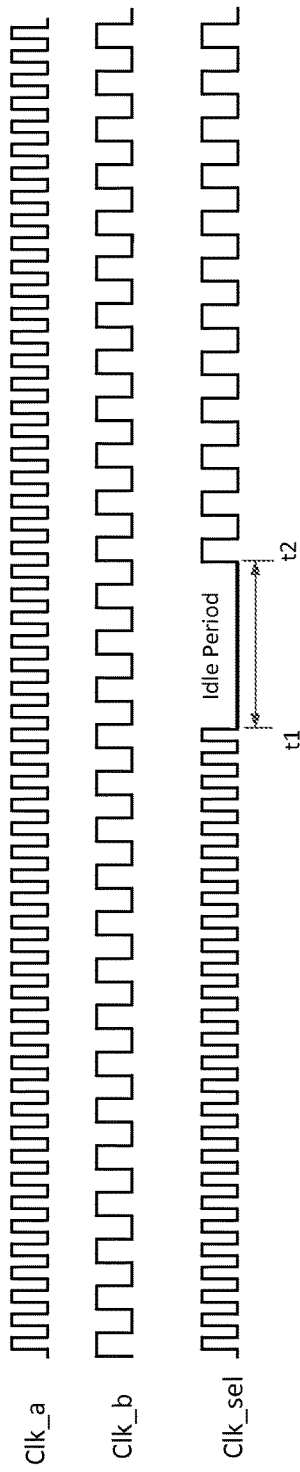
FIG. 3 shows a timing diagram illustrating an example of clock switching.

FIG. 3 shows a timing diagram in which the selected clock signal Clk_sel of the multiplexer 210 is switched from input clock signal Clk_a to input clock signal Clk_b. In this example, the selected clock Clk_sel is initially provided (sourced) by input clock signal Clk_a. At time t1, output of clock signal Clk_a is disabled at the multiplexer 210. During an idle period, the multiplexer 210 does not output a clock signal. The idle period may span approximately three cycles of clock signal Clk_b for the example in FIG. 2. At the end of the idle period at time t2, output of clock signal Clk_b is enabled at the multiplexer 210.

It is to be appreciated that the multiplexer 120 is not limited to the exemplary implementation shown in FIG. 2, and therefore that the multiplexer 120 may be implemented using other circuits. It is also to be appreciated that other glitch-free implementations of the multiplexer 120 may also have an idle period (i.e., period of no clock output) during clock switching.

The idle period during clock switching causes a voltage overshoot in the PDN when the clock output of the multiplexer 120 is disabled and a voltage droop in the PDN when the clock output of the multiplexer 120 is enabled with the new input clock signal. The magnitude of the overshoot depends on the frequency of the current input clock signal. The higher the frequency of the current input clock signal, the greater the overshoot. This is because a higher clock frequency results in a larger rate of change in the current load on the PDN when output of the current input clock signal is disabled at the multiplexer 120. Similarly, the magnitude of the droop depends on the frequency of the new input clock signal. The higher the frequency of the new input clock signal, the greater the droop. This is because a higher clock frequency results in a larger rate of change in the current load on the PDN when output of the new input clock signal is enabled at the multiplexer 120. If the voltage overshoot and/or droop are too high, then the overshoot and/or droop may cause other circuits (not shown) that are coupled to the PDN to malfunction. Accordingly, techniques for reducing overshoot and/or droop on the PDN during clock switching are desirable.

Embodiments of the present disclosure reduce voltage overshoot and/or droop on the PDN during clock switching by ramping down the frequency of the clock signal to the processor 110 before the current input clock signal is disabled and/or ramping up the frequency of the clock signal to the processor 110 when the new input clock signal is enabled, as discussed further below.

Figure 4:
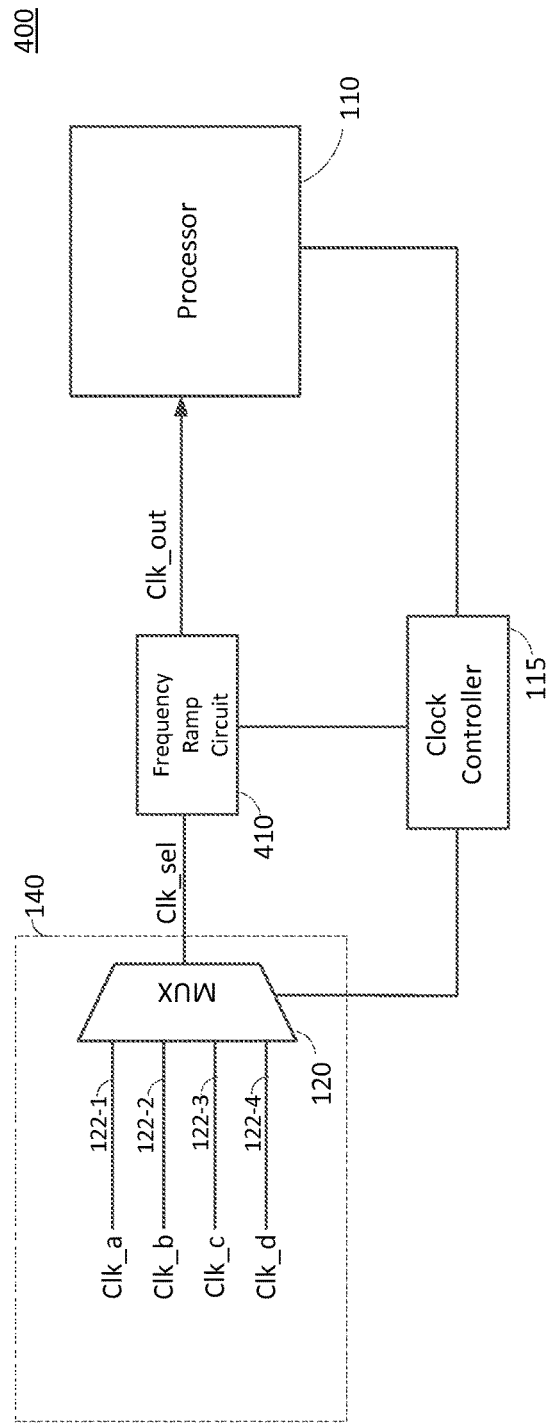
FIG. 4 shows a system with frequency scaling according to an embodiment of the present disclosure.

FIG. 4 shows an exemplary system 400 with dynamic frequency scaling according to an embodiment of the present disclosure. The system 400 comprises a frequency ramp circuit 410 coupled between the clock circuit 140 and the processor 110. The frequency ramp circuit 410 is configured ramp down and/or ramp up the frequency of the selected clock signal Clk_sel, and output the resulting frequency-adjusted clock signal (denoted "Clk_out") to the processor 110, as discussed further below.

When the output of the multiplexer 120 switches from a current one of the input clock signals Clk_a to Clk_d to a new one of the input clock signals Clk_a to Clk_d, the frequency ramp circuit 410 may ramp down the frequency of the output clock signal Clk_out before the current input clock signal is disabled. During ramp down, the output clock signal is provided (sourced) by the current input clock signal. The frequency ramp circuit 410 may ramp down the frequency of the output clock signal Clk_out using any one of a variety of techniques, as discussed further below. Ramping down the frequency of the output clock signal Clk_out causes the current load on the PDN to decrease at a slower rate compared with abruptly stopping the output clock signal at full frequency (i.e., frequency of current input clock signal), thereby reducing voltage overshoot on the PDN.

The frequency ramp circuit 410 may ramp up the frequency of the output clock signal Clk_out when the new input clock signal is enabled. During ramp up, the output clock signal Clk_out is provided (sourced) by the new input clock signal. The frequency ramp circuit 410 may ramp up the frequency of the output clock signal Clk_out using any one of a variety of techniques, as discussed further below. Ramping up the frequency of the output clock signal Clk_out causes the current load on the PDN to increase at a slower rate compared with abruptly outputting the output clock signal Clk_out at full frequency (i.e., the frequency of the new input clock signal), thereby reducing voltage droop on the PDN.

In one embodiment, the frequency ramp circuit 410 by may ramp down the frequency of the output clock signal Clk_out in one or more steps, in which the frequency of the output clock signal is reduced by a certain amount in each step. The time duration of each step may be predetermined. For example, if the frequency ramp circuit 410 ramps down the frequency of the output clock signal Clk_out in a plurality of steps, the frequency ramp circuit 410 may reduce the frequency of the output clock signal CLK_out to a lower frequency in each step.

In one embodiment, the frequency ramp circuit 410 by may ramp up the frequency of the output clock signal Clk_out in one or more steps, in which the frequency of the output clock signal is increased by a certain amount in each step. The time duration of each step may be predetermined. For example, if the frequency ramp circuit 410 ramps up the frequency of the output clock signal Clk_out in a plurality of steps, the frequency ramp circuit 410 may increase the frequency of the output clock signal Clk_out to a higher frequency in each step.

In one example, the frequency ramp circuit 410 may comprise a frequency divider that reduces the frequency of the output clock signal Clk_out by dividing the frequency of the selected clock signal Clk_sel input to the ramp circuit 410 by a controllable amount. In this example, the output clock signal Clk_out is the frequency-divided selected clock signal Clk_sel. The frequency ramp circuit 410 may reduce the frequency of the output clock signal Clk_out by an increasing amount over time for ramp down by increasing the amount (e.g., divisor) by which the frequency of the selected clock signal Clk_sel is divided over time. Also, the frequency ramp circuit 410 may increase the frequency of the output clock signal Clk_out by an increasing amount over time for ramp up by decreasing the amount (e.g., divisor) by which the frequency of the selected clock signal Clk_sel is divided over time. In this example, the maximum frequency of the output clock signal Clk_out may occur when the divisor is one, in which case the frequency of the output clock signal Clk_out is approximately equal to the frequency of the selected clock signal Clk_sel.

In another example, the frequency ramp circuit 410 may comprise a clock swallower that reduces the frequency of the output clock signal Clk_out by selectively swallowing pulses of the selected clock signal Clk_sel input to the ramp circuit 410. In this example, the output clock signal Clk_out is the pulse-swallowed selected clock signal Clk_sel. The frequency ramp circuit 410 may reduce the frequency of the output clock signal Clk_out by an increasing amount over time for ramp down by increasing the percentage of pulses of the selected clock signal Clk_out that are swallowed over time. Also, the frequency ramp circuit 410 may increase the frequency of the output clock signal by an increasing amount over time for ramp up by decreasing the percentage of pulses of the selected clock signal Clk_sel that are swallowed over time. In this example, the maximum frequency of the output clock signal Clk_out may occur when no pulses of the selected clock signal Clk_sel are swallowed, in which case the frequency of the output clock signal Clk_out is approximately equal to the frequency of the selected signal Clk_sel.

Figure 5:
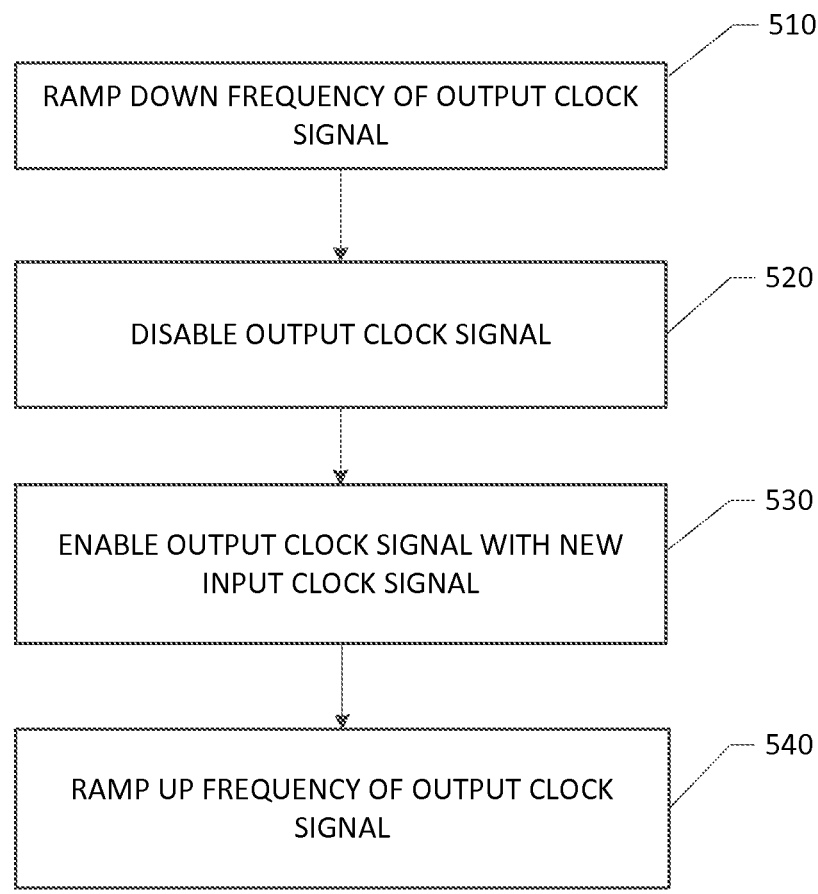
FIG. 5 shows an exemplary procedure for clock switching according to an embodiment of the present disclosure.

FIG. 5 shows an exemplary procedure 500 for frequency ramp down and frequency ramp up during clock switching according to an embodiment of the present disclosure. The procedure 500 may be performed by the controller 115, the multiplexer 120 and/or the ramp circuit 410. The procedure 500 may be performed when the clock output to the processor 110 switches from a current one of the input clock signals Clk_a to Clk_d to a new one of the input clock signals Clk_a to Clk_d.

In step 510, the frequency of the output clock signal Clk_out is ramped down. During ramp down, the output clock signal Clk_out is provided (sourced) by the current input clock signal. The frequency ramp circuit 410 may perform this step by frequency dividing the selected clock signal Clk_sel by an increasing amount over time or swallowing an increasing percentage of clock pulses of the selected clock signal Clk_sel over time.

In step 520, the output clock signal Clk_out is disabled. For example, the controller 115 may disable the output clock signal Clk_out by instructing the multiplexer 120 to disable output of the selected clock signal Clk_sel to the ramp circuit when the frequency ramp circuit 410 completes ramp down of the output clock signal Clk_out.

In step 530, the output clock signal Clk_out is enabled using the new input clock signal. For example, the multiplexer 120 may enable the output clock signal by enabling output of the selected clock signal Clk_sel to the ramp circuit 410 after an idle period to prevent glitch. In this example, the multiplexer 120 may enable the output clock signal using the new input clock signal by selecting the new input clock signal after the current input clock signal is disabled.

In step 540, the frequency of the output clock signal Clk_out is ramped up. During ramp up, the output clock signal Clk_out is provided (sourced) by the new input clock signal. The frequency ramp circuit 410 may perform this step by frequency dividing the selected clock signal Clk_sel by a decreasing amount over time or swallowing a decreasing percentage of clock pulses of the selected clock signal Clk_sel over time. In one aspect, the multiplexer 120 may output a signal to the controller 115 indicating when the selected clock signal Clk_sel is enabled. In response, the controller 115 may trigger the ramp circuit 410 to start ramp up.

Figure 6:
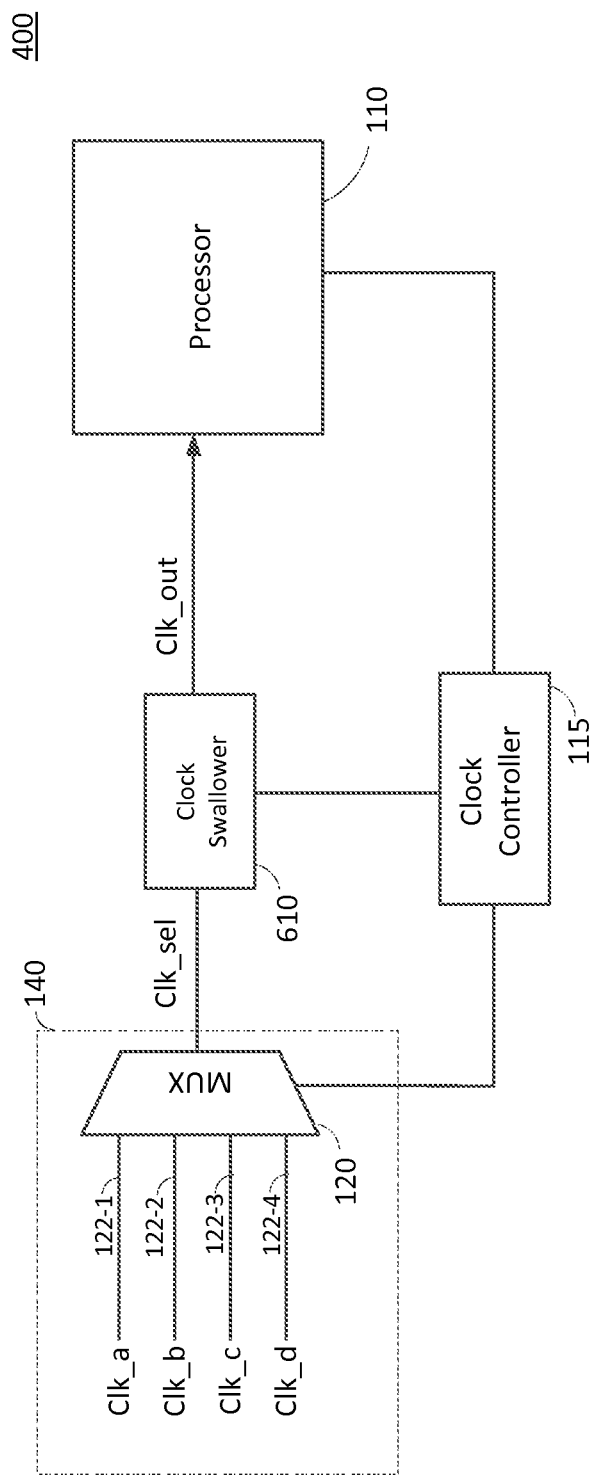
FIG. 6 shows a system comprising a clock swallower according to an embodiment of the present disclosure.

FIG. 6 shows an example in which the frequency ramp circuit 410 in FIG. 4 comprises a clock swallower 610. The clock swallower 610 is configured to reduce the frequency of the output clock signal Clk_out by a variable amount by selectively swallowing pulses of the selected clock signal Clk_sel input to the ramp circuit 410, as discussed above. In this example, the output clock signal Clk_out is the pulse-swallowed selected clock signal Clk_sel.

Figure 7A:
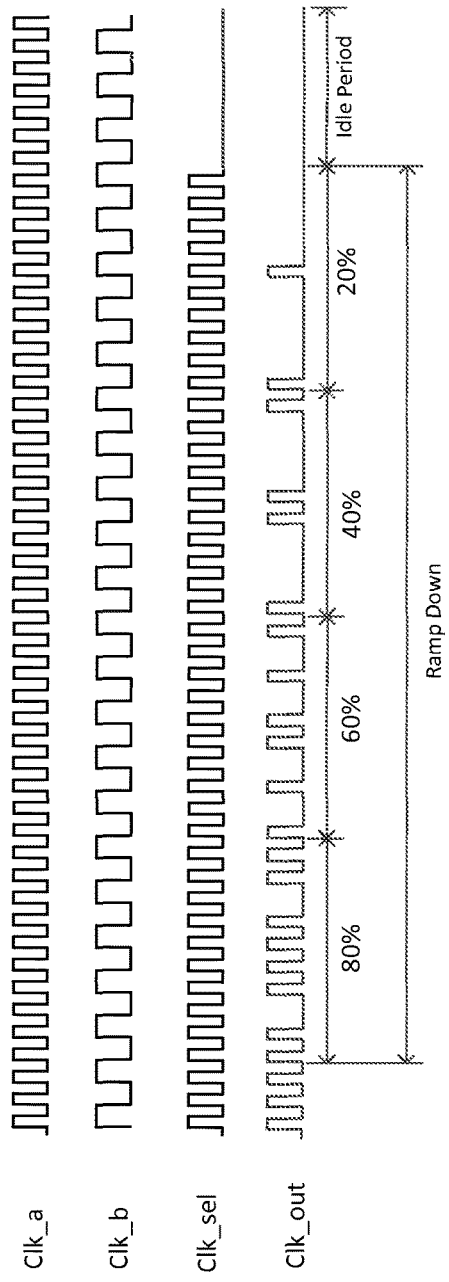
FIGS. 7A and 7B show timing diagrams illustrating an example of clock switching according to an embodiment of the present disclosure.
Figure 7B:
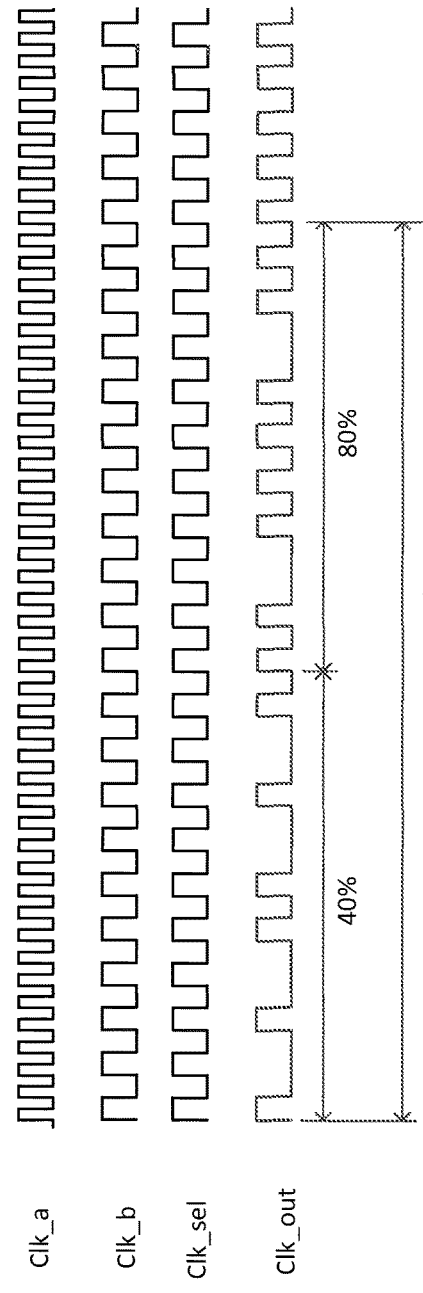

Exemplary operations of the clock swallower 610 will now be described with reference to FIGS. 7A and 7B. FIGS. 7A and 7B show exemplary timing diagrams of input clock signals Clk_a and Clk_b, in which the multiplexer 120 switches from input clock signal Clk_b to input clock signal Clk_a. FIGS. 7A and 7B also show the selected clock signal Clk_sel input to the clock swallower 610, and the output signal clock Clk_out to the processor 110.

Before the idle period, the clock swallower 610 ramps down the frequency of the output clock signal Clk_out in four steps. During ramp down, the output clock signal Clk_out is provided (sourced) by input clock signal Clk_a. In the first step, the clock swallower 610 swallows 20% of the pulses of the selected clock signal Clk_sel to reduce the frequency of the output clock signal Clk_out to 80% of the frequency of input clock signal Clk_a, as shown in FIG. 7A. In the second step, the clock swallower 610 swallows 40% of the pulses of the selected clock signal Clk_sel to reduce the frequency of the output clock signal Clk_out to 60% of the frequency of input clock signal Clk_a. In the third step, the clock swallower 610 swallows 60% of the pulses of the selected clock signal Clk_sel to reduce the frequency of the output clock signal to 40% of the frequency of input clock signal Clk_a. Finally, in the fourth step, the clock swallower 610 swallows 80% of the pulses of the selected clock signal Clk_sel to reduce the frequency of the output clock signal to 20% of the frequency of input clock signal Clk_a. Thus, in each subsequent step, the clock swallower 610 swallows a larger percentage of clock pulses.

The multiplexer 120 then disables the selected clock signal Clk_sel (i.e., disables output of clock signal Clk_a), which reduces the frequency of the output clock signal Clk_out to zero. Thus, in this example, the frequency of the output clock signal Clk_out (which is initially provided by input clock signal Clk_a) is ramped down in steps of 20% instead of abruptly going to zero. The frequency ramp down reduces voltage overshoot on the PDN compared with abruptly disabling the output clock signal Clk_out at full frequency, as shown in FIG. 3.

After the output clock signal Clk_out is disabled, the multiplexer 120 does not output a clock signal for an idle period to prevent glitch, as shown in FIG. 7A. At the end of the idle period, the multiplexer 130 enables the selected clock signal Clk_sel with input clock signal Clk_b. As shown in FIG. 7B, the clock swallower 610 ramps up the frequency of the output clock signal Clk_out to the frequency of input clock signal Clk_b in three steps. In the first step, the clock swallower 610 swallows 60% of the clock pulses of the selected clock signal Clk_sel to increase the frequency of the output clock signal Clk_out from zero to 40% of the frequency of clock signal Clk_b, as shown in FIG. 7B. In the second step, the clock swallower 610 swallows 20% of the clock pulses of the selected clock signal Clk_sel to increase the frequency of the output clock signal Clk_out to 80% of the frequency of clock signal Clk_b. Finally, in the third stage, the clock swallower 610 stops swallowing clock pulses of the selected clock signal Clk_sel, thereby increasing the frequency of the output clock signal Clk_out to the full frequency of clock signal Clk_b. Thus, in each subsequent step, the clock swallower 610 swallows a smaller percentage of clock pulses. The frequency ramp up reduces the voltage droop on the PDN during the frequency switch compared with abruptly outputting the output clock signal Clk_out at full frequency, as shown in FIG. 3. It is to be appreciated that the ramp down and ramp up sequences shown in FIGS. 7A and 7B are exemplary only. Other examples of ramp down and ramp up sequences are provided below.

In one embodiment, the clock swallower 610 may use different ramp down sequences depending on the frequency of the input clock signal providing (sourcing) the output clock signal. For example, the ramp down sequence for a high-frequency input clock signal may have more steps and reduce the frequency by a smaller percentage in each step compared to a ramp down sequence for a lower-frequency input clock. This is because a lower-frequency clock corresponds to less current load on the PDN from the processor 110, and therefore less overshoot. If the frequency of the input clock signal is low enough, the output clock signal may be disabled without ramp down. This is because the low frequency of the input clock signal may result in a relatively small overshoot that is within an acceptable limit. In this case, the clock swallower 610 may not perform clock swallowing.

In one embodiment, the clock swallower 610 may use different ramp up sequences depending on the frequency of the input clock signal providing (sourcing) the output clock signal. For example, the ramp up sequence for a high-frequency input clock signal may have more steps and increase the frequency by a smaller percentage in each step compared to a ramp up sequence for a lower-frequency input clock. This is because a lower-frequency clock corresponds to less current load on the PDN from the processor 110, and therefore less droop. If the frequency of the input clock signal is low enough, the output clock signal may be enabled after the idle period without ramp up. This is because the low frequency of the input clock signal may result in a relatively small droop that is within an acceptable limit. In this case, clock swallower 610 may not perform clock swallowing.

Figure 8:
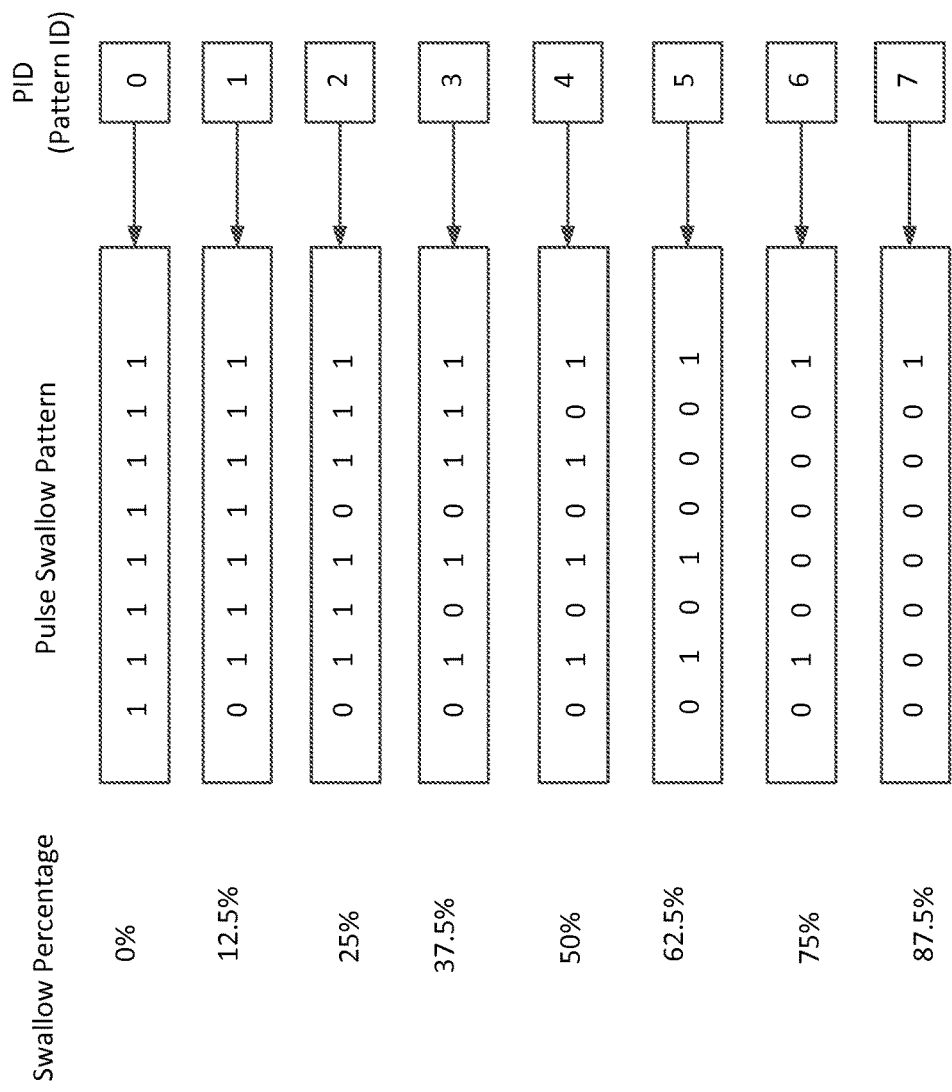
FIG. 8 shows exemplary pulse swallow patterns according to an embodiment of the present disclosure.

In one embodiment, the clock swallower 610 may be configured to swallow clock pulses according to one of a number of different pulse swallow patterns. In this regard, FIG. 8 shows an example of eight pulse swallow patterns, where each pulse swallow patter is identified by a unique pattern ID (PID). In this example, each pulse swallow pattern is defined by a sequence of eight bits, in which a bit value of zero corresponds to a pulse swallow and a bit value of one corresponds to a pulse pass. For example, the pulse swallow pattern corresponding to PID 2 has two zero-value bits and six one-value bits. Thus, for this pulse swallow pattern, the clock swallower 610 swallows about 25% of the clock pulses of the selected clock signal Clk_sel, corresponding to a frequency reduction of 25%. As a result, for this pulse swallow pattern, the frequency of the output clock signal is reduced to 75% of the frequency of the input clock signal providing (sourcing) the output clock signal.

In another example, the pulse swallow pattern corresponding to PID 5 has five zero-value bits and three one-value bits. Thus, for this pulse swallow pattern, the clock swallower 610 swallows about 62.5% of the clock pulses of the selected clock signal Clk_sel, corresponding to a frequency reduction of 62.5%. As a result, for this pulse swallow pattern, the frequency of the output clock signal is reduced to 37.5% of the frequency of the input clock signal providing (sourcing) the output clock signal.

In the example in FIG. 8, the pulse swallow pattern corresponding to PID 0 comprises all one-value bits. Thus, for this pulse swallow pattern, the clock swallower 610 passes all of the clock pulses of the output clock signal (i.e., does not perform clock swallowing).

In one aspect, the controller 115 may instruct the clock swallower 610 to swallow pulses of the selected clock signal Clk_sel according to a particular pulse swallow pattern by inputting the corresponding PID to the clock swallower 610. For example, if the controller 115 inputs PID 6 to the clock swallower 610, the clock swallower 610 may swallow pulses according to the corresponding pulse swallow pattern shown in FIG. 8. In this example, the clock swallower 610 swallows about 75% of the pulses of the sel clock signal Clk_sel, which reduces the frequency of the output clock signal Clk_out to about 25% of the frequency of the input clock signal providing (sourcing) the output clock signal Clk_out.

When the clock swallower 610 swallows clock pulses according to a pulse swallow pattern, the clock swallower 610 may repeat the pattern. Using the example in FIG. 8, the clock swallower 610 may repeat the pulse swallow pattern for every eight pulses of the selected clock signal Clk_sel, where eight is the number of bits defining the pattern. For instance, for the swallow pattern corresponding to PID 3 in FIG. 8, the clock swallower 610 may swallow three pulses for every eight pulses of the selected clock signal Clk_sel according to the pattern.

In one embodiment, a ramp down sequence may be defined for each input clock signal by a corresponding sequence of PIDs. The sequence of PIDs for an input clock signal identifies a sequence of pulse swallow patterns to be used by the clock swallower 610 to ramp down the frequency of the output clock signal Clk_out when the output clock signal Clk_out is provided (sourced) by the input clock signal.

In this embodiment, the clock swallower 610 may perform a ramp down according to a sequence of PIDs by sequentially performing clock swallowing according to each PID in the sequence. For each PID in the sequence, the clock swallower 610 may swallow clock pulses according to the swallow pattern corresponding to the PID. The amount of time the clock swallower 610 spends on each PID during ramp down may correspond to a predetermined time duration or a predetermined number of repeats of the corresponding swallow pattern. The PIDs in the ramp down sequence are ordered such that each subsequent PID in the sequence corresponds to a larger percentage of clock pulse swallows. Thus, as the clock swallower 610 sequentially goes through the PIDs in the sequence, the clock swallower 610 swallows an increasing percentage of clock pulses.

In one embodiment, the controller 115 may include a table in memory, in which the table comprises a ramp down sequence for each input clock signal Clk_a to Clk_d. The ramp down sequence for each input clock signal may comprise a sequence of PIDs identifying a sequence of pulse swallow patterns to be used by the clock swallower 610 to ramp down the frequency of the output clock signal Clk_out, as discussed above. When switching the output clock signal Clk_out from a current clock signal one of the clock signal Clk_a to Clk_d to a new one of the clock signals Clk_a to Clk_b, the controller 115 may retrieve the ramp down sequence for the current input clock signal from the table, and instruct the clock swallower 610 to ramp down the frequency of the output clock signal according to the retrieved ramp down sequence.

In one embodiment, the ramp down sequence for each input clock signal may be defined by a clock index that maps each input clock signal to one of the PIDs. In this embodiment, the ramp down sequence for each input clock signal may jump from PID 0 to the mapped PID in the first step of the ramp down sequence. The remaining steps in the ramp down sequence are defined by the remaining PIDs in the ramp down direction. This may be explained by way of example with reference to FIG. 9.

Figure 9:
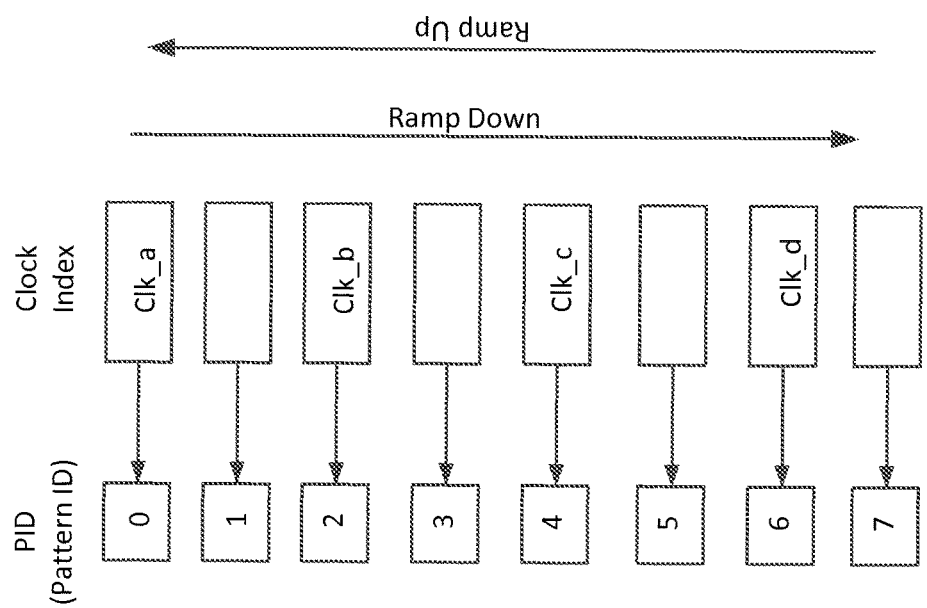
FIG. 9 shows an exemplary clock index according to an embodiment of the present disclosure.

FIG. 9 shows an exemplary clock index, in which each input clock signal Clk_a to Clk_d is mapped to a PID. In this example, the ramp down sequence for each input clock signal jumps from PID 0 to the mapped PID in the first step of the ramp down sequence. The remaining steps in the ramp down sequence are defined by the remaining PIDs in the ramp down direction, which is indicated by the downward arrow in FIG. 9.

In the example in FIG. 9, the input clock signal Clk_b is mapped to PID 2. Thus, the ramp down sequence for input clock signal Clk_b may be given as follows:

PID 0→PID 2→PID 3→PID 4→PID 5→PID 6→PID 7.

Also, in this example, input clock signal Clk_c is mapped to PID 4. Thus, the ramp down sequence for input clock signal Clk_c may be given as follows:

PID 0→PID4→PID5→PID6→PID7.

Further, in this example, input clock signal Clk_d is mapped to PID 6. Thus, the ramp down sequence for input clock signal Clk_d may be given as follows:

PID 0→PID6→PID7.

Lastly, in this example, input clock signal Clk_a is mapped to PID 0. Thus, the ramp down sequence for input clock signal Clk_a may be given as follows:

PID 0→PID 1→PID 2→PID 3→PID 4→PID 5→PID 6→PID 7.

In this example, the ramp down sequence for input clock signal Clk_a goes through all of the PIDs in FIG. 9 in the ramp down direction.

In one embodiment, a ramp up sequence may be defined for each input clock signal by a corresponding sequence of PIDs. The sequence of PIDs for an input clock signal identifies a sequence of pulse swallow patterns to be used by the clock swallower 610 to ramp up the frequency of the output clock signal Clk_out when the output clock signal Clk_out is provided (sourced) by the input clock signal.

In this embodiment, the clock swallower 610 may perform a ramp up according to a sequence of PIDs by sequentially performing clock swallowing according to each PID in the sequence. For each PID in the sequence, the clock swallower 610 may swallow clock pulses according to the swallow pattern corresponding to the PID. The amount of time the clock swallower 610 spends on each PID during ramp up may correspond to a predetermined time duration or a predetermined number of repeats of the corresponding swallow pattern. The PIDs in the ramp up sequence are ordered such that each subsequent PID in the sequence corresponds to a smaller percentage of clock pulse swallows. Thus, as the clock swallower 610 sequentially goes through the PIDs in the sequence of PID, the clock swallower 610 swallows a decreasing percentage of clock pulses.

In one embodiment, the controller 115 may include a table in memory, in which the table comprises a ramp up sequence for each input clock signal Clk_a to Clk_d. The ramp up sequence for each input clock signal may comprise a sequence of PIDs identifying a sequence of pulse swallow patterns to be used by the clock swallower 610 to ramp up the frequency of the output clock signal Clk_out, as discussed above. When switching the output clock signal Clk_out from a current clock signal one of the clock signal Clk_a to Clk_d to a new one of the clock signals Clk_a to Clk_b, the controller 115 may retrieve the ramp up sequence for the new input clock signal from the table, and instruct the clock swallower 610 to ramp up the frequency of the output clock signal when the new input clock signal is enabled according to the retrieved ramp up sequence.

In one embodiment, the ramp up sequence for each input clock signal may be defined by a clock index that maps each input clock signal to one of the PIDs. In this embodiment, the ramp up sequence for each input clock signal may sequence through each PID having a higher percentage of clock pulse swallows than the mapped PID in the ramp up direction. After reaching the mapped PID, the ramp up sequence may jump from the mapped PID to PID 0. This may be explained using the example in FIG. 9.

In this example, the ramp up sequence for each input clock signal sequences through PID 7 to the mapped PID in the ramp up direction, which is indicated by the upward arrow in FIG. 9. After reaching the respective mapped PID, each ramp up sequence may jump from the mapped PID to PID 0.

In the example in FIG. 9, the input clock signal Clk_b is mapped to PID 2. Thus, the ramp up sequence for input clock signal Clk_b may be given as follows:

PID 7→PID 6→PID 5→PID 4→PID 3→PID 2→PID0.

Also, in this example, input clock signal Clk_c is mapped to PID 4. Thus, the ramp up sequence for input clock signal Clk_c may be given as follows:

PID 7→PID 6→PID 5→PID 4→PID 0.

Further, in this example, input clock signal Clk_d is mapped to PID 6. Thus, the ramp up sequence for input clock signal Clk_d may be given as follows:

PID 7→PID 6→PID0.

Finally, in this example, input clock signal Clk_a is mapped to PID 0. Thus, the ramp up sequence for input clock signal Clk_a may be given as follows:

PID 7→PID 6→PID 5→PID 4→PID 3→PID 2→PID 1→PID 0.

In this example, the ramp up sequence for input clock signal Clk_a goes through all of the PIDs in FIG. 9 in the ramp up direction. Since the same clock index is used for ramp down and ramp up in this example, the ramp up sequence for each input clock signal is the reverse of the ramp down sequence for the input clock signal.

Figure 10:
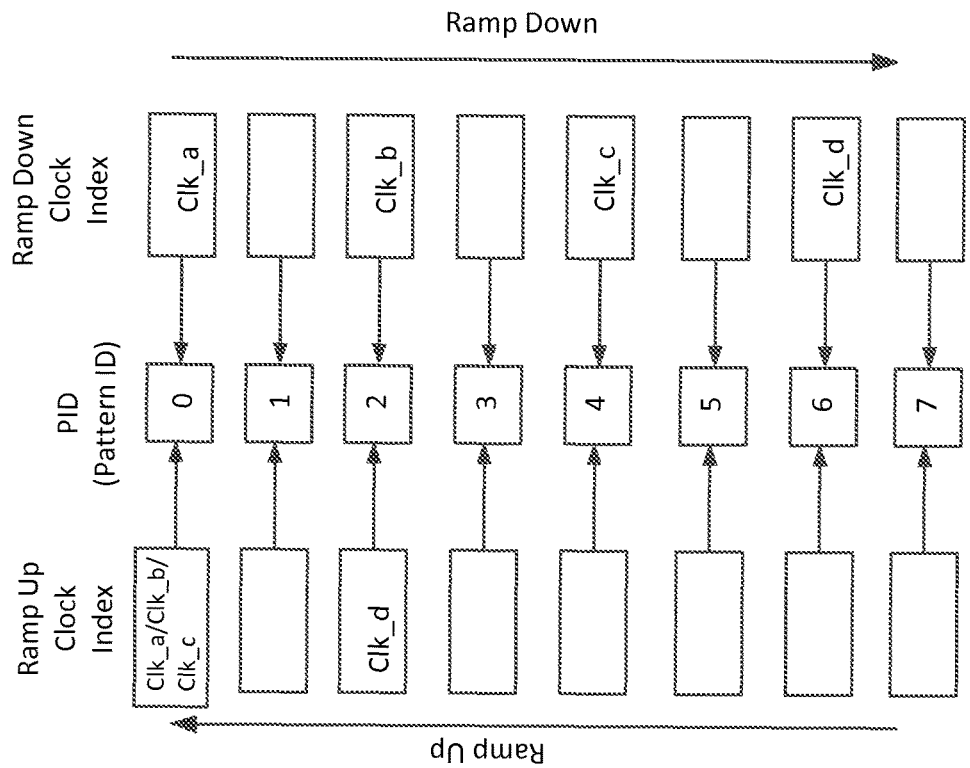
FIG. 10 shows an exemplary clock index according to another embodiment of the present disclosure.

It is to be appreciated that the clock index for ramp down and ramp up may be different. In this regard, FIG. 10 shows an example of a clock index for ramp down and a separate clock index for ramp up. In this example, the clock index for ramp down is the same as the clock index in FIG. 9. Therefore, the ramp down sequences for FIGS. 9 and 10 are the same. In this example, the clock index for ramp up maps each of input clock signals Clk_a, Clk_b and Clk_c to PID 0 and maps input clock signal Clk_d to PID 2. Thus, in this example, the ramp up sequence for each of input clock signals Clk_a, Clk_b and Clk_c may be given as follows:

PID 7→PID 6→PID 5→PID 4→PID 3→PID 2→PID 1→PID 0.

The ramp up sequence for input clock signal Clk_d may be given as follows:

PID 7→PID 6→PID 5→PID 4→PID 3→PID 2→PID0.

It is to be appreciated that embodiments of the present disclosure are not limited to clock switching. For example, embodiments of the present disclosure may be used to ramp down the frequency of the output clock signal when the processor 110 transitions from an active mode to an idle mode to conserve power, and to ramp up the frequency of the output clock signal when the processor 110 transitions back to the active mode.

Figure 11:
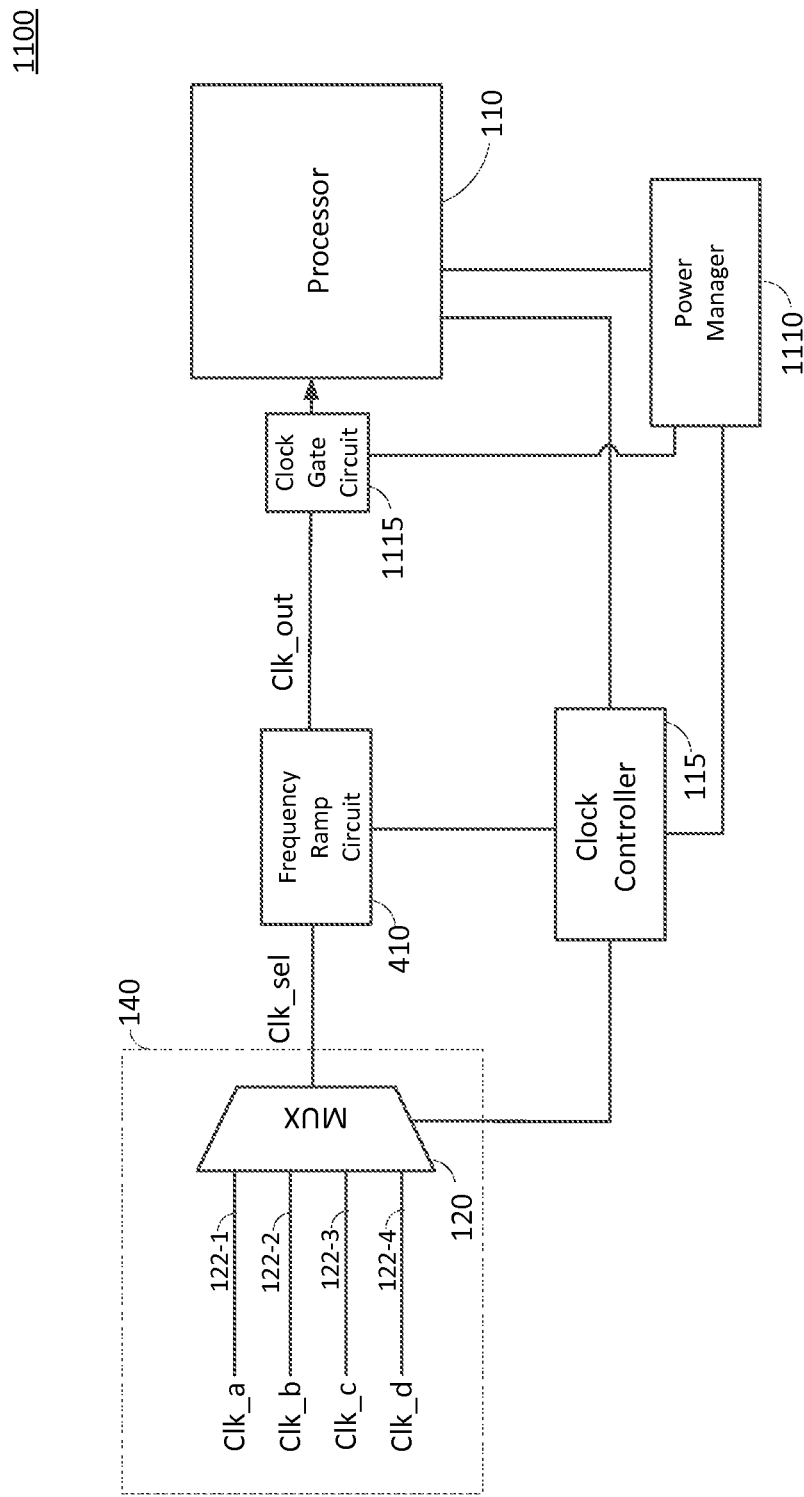
FIG. 11 shows an exemplary system comprising a power manager according to an embodiment of the present disclosure.

In this regard, FIG. 11 shows an exemplary system 1100 further comprising a power manager 1110 configured to manage power of the processor 110, and a clock gate circuit 1115 configured to selectively gate the clock signal to the processor 110. In one aspect, the power manager 1110 may be configured to place the processor 110 in an idle mode to conserve power when the processor is not in use. To do this, the power manager 1100 may gate the clock signal using the clock gate circuit 1115. Gating the clock signal may stop most or all switching activity in the processor 110, and therefore significantly reduce dynamic power consumption by the processor 110. When the processor 110 is later needed (e.g., to execute instructions), the power manager 1110 may transition the processor 110 back to the active mode by un-gating the clock signal using the clock gate circuit 1115. It is to be appreciated that the clock gate circuit 1115 may be in the processor 110 and configured to gate internal clock paths in the processor 110 when the processor is in the idle mode.

In one embodiment, when the power manager 1110 places the processor 110 in the idle mode, the power manager 1110 may send an idle-mode signal to the clock controller 115 instructing the clock controller 115 to ramp down the frequency of the output clock signal Clk_out to the processor 110. The power manager 1110 may do this before the clock gate circuit 1115 gates the clock signal at the processor 110. The clock controller 115 may ramp down the frequency of the output clock signal Clk_out according to a ramp down sequence corresponding to the input clock signal providing (sourcing) the output clock signal. The ramp down sequence may comprise one or more steps, in which the frequency of the output clock signal is reduced by an increasing amount in each subsequent step. The ramp circuit 410 may ramp down the frequency of the output clock signal by dividing the clock frequency of the selected clock signal Clk_sel or swallowing pulses of the selected clock signal Clk_sel, as discussed above.

In this embodiment, the clock controller 115 may instruct the ramp circuit 410 to ramp down the frequency of the output clock signal Clk_out all the way to approximately zero hertz or to a frequency that is lower than the input clock signal providing (sourcing) the output clock signal Clk_out. Once ramp down is complete, the clock controller 115 may inform the power manager 1110 that the frequency has been ramped down. In response, the power manager 120 may gate the clock signal to the processor 110 to place the processor 110 in the idle mode.

Ramping down the frequency of the output clock signal Clk_out may reduce voltage overshoot on the PDN when the processor 110 is placed in the idle mode. This is because ramping down the frequency decreases the current load on the PDN at a slower rate compared with gating the clock to the processor 110 at full frequency (i.e., the frequency of the input clock signal sourcing the output clock signal).

In this embodiment, the clock controller 115 may disable the output clock signal when the processor 110 is in the idle mode. For example, the clock controller 115 may disable the selected clock signal Clk_sel at the end of ramp down.

When the power manager 1110 transitions the processor 110 back to the active mode, the power manager 1110 may send an active-mode signal to the clock controller 115 instructing the clock controller 115 to ramp up the frequency of the output clock signal Clk_out to full frequency (i.e., frequency of the input clock signal sourcing the output clock signal). The power manager 1110 may ramp up the frequency after the clock signal to the processor 110 is un-gated. The clock controller 115 may ramp up the frequency of the output clock signal Clk_out according to a ramp up sequence corresponding to the input clock signal providing (sourcing) the output clock signal. The ramp up sequence may comprise one or more steps, in which the frequency of the output clock signal is increased to a higher frequency in each subsequent step. The ramp circuit 410 may ramp up the frequency of the output clock signal by dividing the clock frequency of the selected clock signal Clk_sel by a decreasing amount over time or swallowing a decreasing percentage of pulses of the selected clock signal Clk_sel over time, as discussed above.

Ramping up the frequency of the output clock signal Clk_out may reduce voltage droop on the PDN when the processor 110 is placed the active mode. This is because ramping up the frequency increases the current load on the PDN at a slower rate compared with un-gating the clock to the processor 110 at full frequency (i.e., the frequency of the input clock signal sourcing the output clock signal).

In one embodiment, the power manager 1110 may place the processor 110 in the idle mode when the processor 110 executes a wait-for-interrupt (WFI) instruction, a wait-for-event (WFE) instruction, or other instruction. After the processor 110 is placed in the idle mode, the power manager 1110 may transition the processor 110 back to the active mode when the power manager 1110 receives an interrupt signal or a certain event occurs. The interrupt signal may come from a device (e.g., peripheral device) that needs the processor. In another example, the interrupt signal may come from a timer. In this example, the timer may trigger a counter when the processor 110 is placed in the idle mode, and output the interrupt signal when the count value of the counter reaches a predetermined value.

In another example, the processor 110 (e.g., GPU) may process data in time frames. In this example, the processor 110 may finish processing data for a current time frame before data for the next time frame is received. In this case, when the processor 110 is finished processing the data for current time frame, the processor 110 may inform the power manager 1110 that processing for the current frame is finished. In response, the power manager 1110 may place the processor 110 in the idle mode to conserve power. The power manager 1110 may transition the processor 110 back to the active mode at the start of the next time frame. In this example, the power manager 1110 may have a timer that tracks the boundaries of the time frames. This allows the power manager 1110 to determine the start of the next time frame, and therefore transition the processor 110 back to the active mode at the start of the next time frame.

Figure 12:
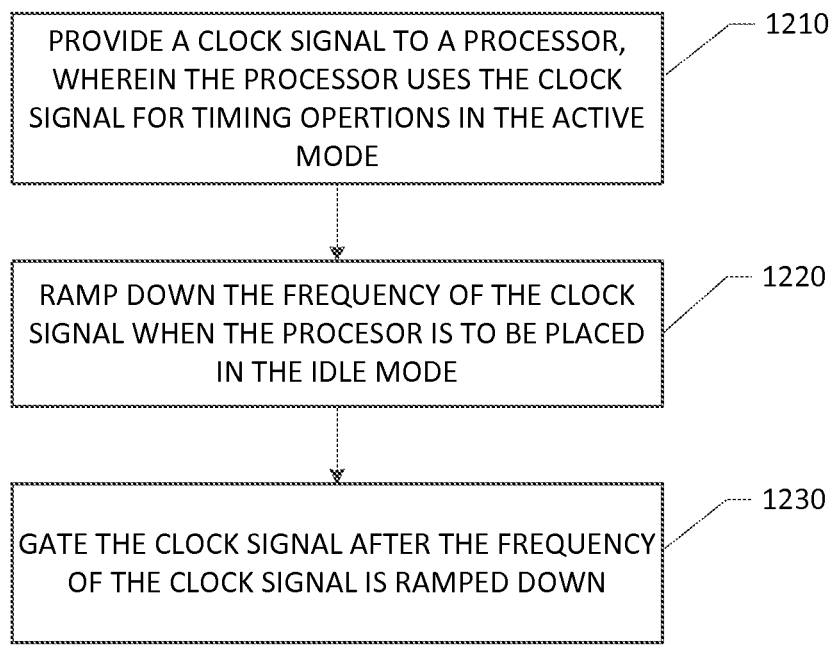
FIG. 12 shows an exemplary procedure for transitioning a processor between an active mode and an idle mode according to an embodiment of the present disclosure.

FIG. 12 shows an exemplary procedure 1200 for transitioning a processor between an active mode and an idle mode. The method may be performed by the power manager 1110, the clock controller 115, the multiplexer 120, the clock gate circuit 1115 and/or the ramp circuit 410.

In step 1210, a clock signal is provided to the processor, wherein the processor uses the clock signal for timing operations in the processor in the active mode. For example, the clock signal may be provided by a multiplexer (e.g., multiplexer 120) that outputs a selected one of a plurality of input clock signals to the processor (e.g., processor 110).

In step 1220, a frequency of the clock signal is ramped down when the processor is to be placed in the idle mode. For example, the frequency of the clock signal may be ramped down by swallowing an increasing percentage of pulses of the clock signal over time or dividing the frequency of the clock signal by an increasing amount over time. The clock signal may be ramped down all the way to approximately zero hertz or to a lower frequency.

In step 1230, the clock signal is gated after ramping down the frequency of the clock signal. For example, the clock signal may be gated by a clock gate circuit (e.g., clock gate circuit 1115).

The method may optionally include un-gating the clock signal when the processor is to be placed back in the active mode. For example, the processor may be placed back in the active in response to an interrupt signal, as discussed above. The method may also comprise ramping up the frequency of the clock signal after the clock signal is un-gated. For example, the frequency of the clock signal may be ramped up by swallowing a decreasing percentage of pulses of the clock signal over time or dividing the frequency of the clock signal by a decreasing amount over time.

In one embodiment, the output clock signal may be gated while the processor 110 is in the idle mode by having the multiplexer 120 disable the output clock signal while the processor 110 is in the idle mode. In this embodiment, the clock controller 115 may instruct the multiplexer 120 to disable the selected clock signal Clk_sel at the end of ramp down to disable the output clock signal Clk_out. The clock controller 115 may do this, for example, by unselecting all of the input clock signals. When the processor 110 transitions back to the active mode, the clock controller 115 may instruct the multiplexer 120 to enable the selected clock signal Clk_sel to enable the output clock signal Clk_out and start ramp up when the selected clock signal Clk_sel is enabled. The clock controller 115 may do this, for example, by selecting one of the input clock signals. The selected input clock signal may be the same as the input clock signal that was selected when the processor 110 was last in the active mode. In this embodiment, the clock gate circuit 1115 may be omitted. Also, the clock signal may be gated in step 1230 of method 1200 by having the multiplexer 120 disable output of the clock signal.

Figure 13:
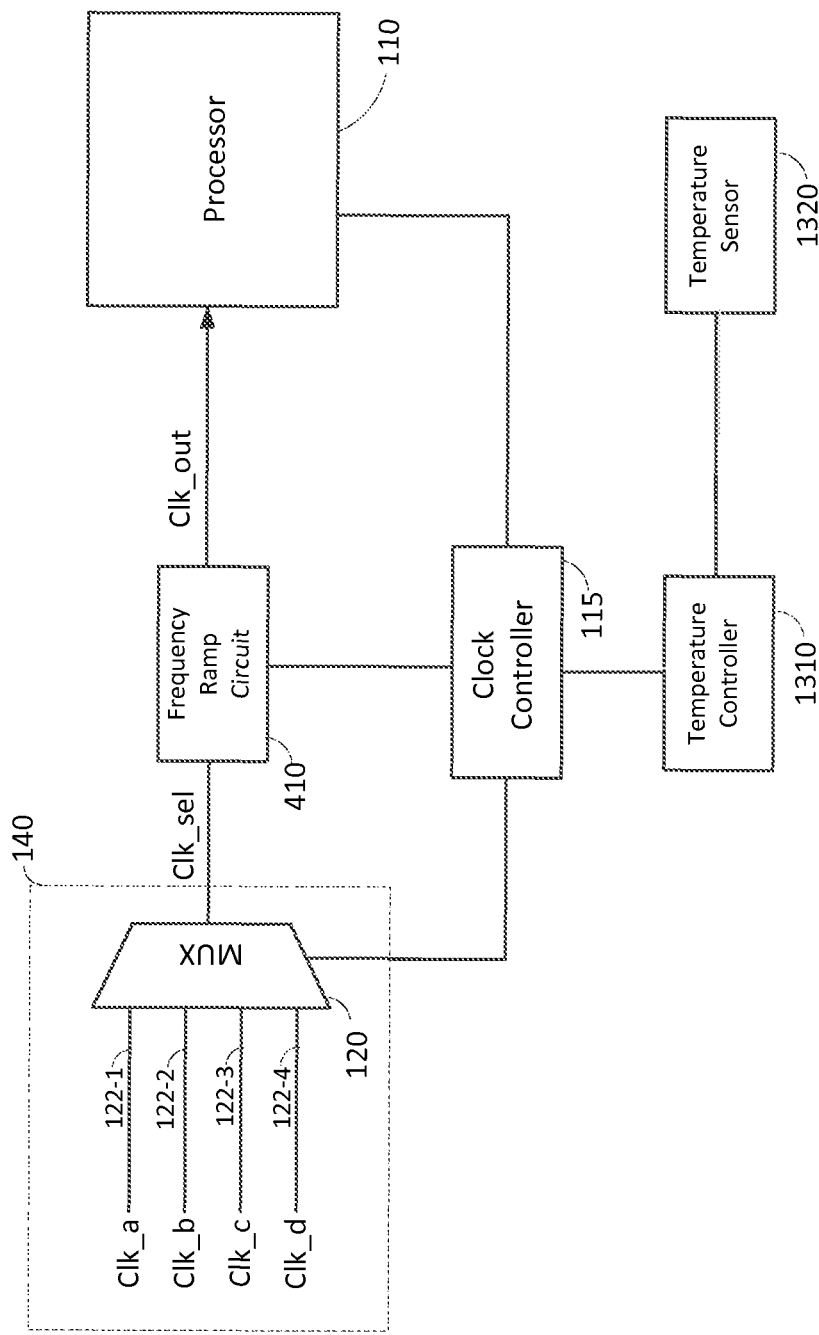
FIG. 13 shows an exemplary system with temperature mitigation according to an embodiment of the present disclosure.

In one embodiment, the frequency ramp circuit 410 may be used to scale (throttle) the frequency of the output clock signal Clk_out for temperature mitigation. In this regard, FIG. 13 shows an exemplary system 1300 further comprising a temperature controller 1310 and one or more temperature sensors 1320.

The temperature sensor 1320 is configured to measure a temperature of the processor 110 and output the measured temperature to the temperature controller 1310. The temperature sensor 1320 may be located near the processor 110 or within the processor 110 to obtain an accurate temperature reading of the processor 110. The temperature controller 1310 is configured to control the frequency of the output clock signal Clk_out based on the measured temperature, as discussed further below.

In one embodiment, the temperature controller 1310 may periodically compare the measured temperature with a temperature threshold. When the measured temperature is below the threshold, the temperature controller 1310 may leave the frequency of the output clock signal alone. When the measured temperature rises above the threshold, the temperature controller 1310 may initiate temperature mitigation to lower the temperature. For example, the temperature controller 1310 may output a command to the clock controller 115 to reduce the frequency of the output clock signal Clk_out. In response, the clock controller 115 may instruct the frequency ramp circuit 410 to reduce the frequency by dividing the frequency of the selected clock signal Clk_sel by a certain amount or swallowing a certain percentage of clock pulses of the selected clock signal Clk_sel.

After the frequency is reduced, the temperature controller 1310 may continue to periodically compare the measured temperature with the temperature threshold. If the measured temperature is still above the threshold, the temperature controller 1310 may send a command to the clock controller 115 to further reduce the frequency of the output clock signal. The reduction in the frequency of the output clock signal causes the temperature of the processor 110 to fall by reducing dynamic power dissipation in the processor 110.

When the measured temperature falls below the temperature threshold, the temperature controller 1310 may command the clock controller 115 to increase the frequency of the output clock signal Clk_out if the frequency of the output clock signal is below a target frequency (e.g., frequency of the input clock signal sourcing the output clock signal). In response, the clock controller 115 may increase the frequency by instructing the ramp circuit 410 to divide the frequency of the selected clock signal Clk_sel by a smaller amount or swallow a smaller percentage of clock pulses of the selected clock signal Clk_sel. The frequency of the output clock signal is increased when the temperature falls below the threshold to regain performance that is lost due to the frequency reduction of the output clock signal.

In general, when the measured temperature rises above the threshold, the temperature controller 1310 may reduce the frequency of the output clock signal to reduce the temperature of the processor 110, as discussed above. When the measured temperature falls below the temperature threshold and the frequency of the output clock signal is below the target frequency, the temperature controller 1310 may increase the frequency of the output clock signal to increase performance of the processor 110.

Figure 14:
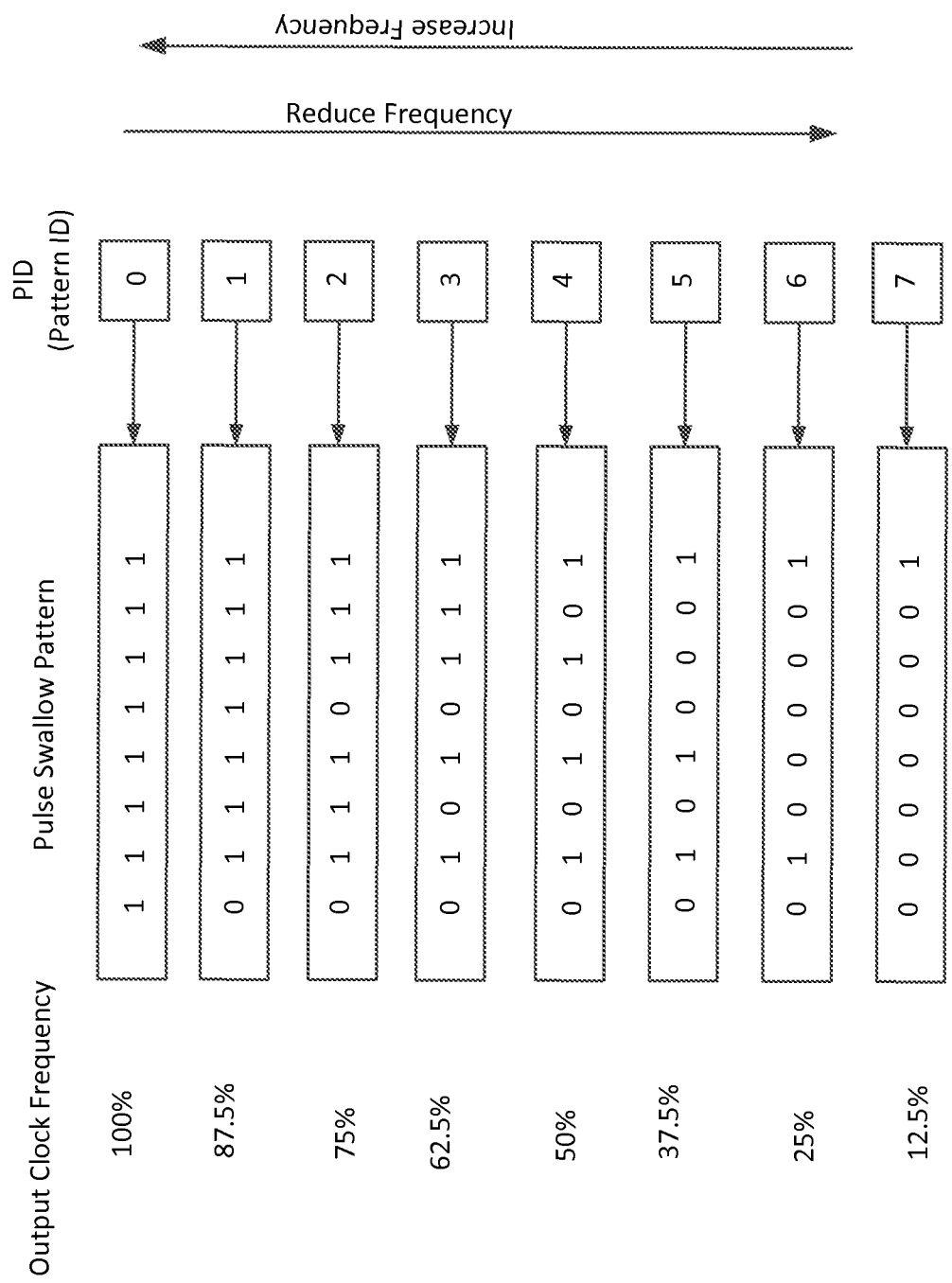
FIG. 14 shows exemplary pulse swallow patterns for temperature mitigation according to an embodiment of the present disclosure.

As discussed above, the ramp circuit 410 may comprise a clock swallower that scales the frequency of the output clock signal by selectively swallowing pulses of the selected clock signal Clk_sel. In this example, the clock controller 115 may instruct the ramp circuit 410 to swallow clock pulses according to one of a plurality of pulse swallow patterns. In this regard, FIG. 14 shows an example of eight pulse swallow patterns that may be used by the clock controller 115 for thermal mitigation. In this example, each swallow pattern may correspond to a unique PID. Although the swallow patterns for thermal mitigation shown in FIG. 14 are similar to the swallow patterns for clock switching shown in FIG. 8, it is to be appreciated that this need not be the case. For each swallow pattern, FIG. 14 shows the corresponding frequency of the output clock signal as a percentage of the input clock signal sourcing the output clock signal.

Before thermal mitigation is initiated, the clock controller 115 may input PID 0 to the ramp circuit 410, in which case the output clock signal Clk_out is at full frequency (i.e., frequency of the input clock signal sourcing the output clock signal). When the measured temperature rises above the threshold, the temperature controller 1310 may initiate thermal mitigation and command the clock controller 115 to reduce the frequency of the output clock signal. In response, the control controller 115 may change the swallow pattern of the ramp circuit 410 to PID 1. This causes the ramp circuit 410 to reduce the frequency of the output clock signal to 87.5% of the frequency of the input clock signal in the example in FIG. 14. If the measured temperature continues to exceed the temperature threshold, the clock controller 115 may receive subsequent commands from the temperature controller 1310 to further reduce the frequency of the output clock signal. Each time the clock controller 115 receives a command to reduce the frequency of the output clock signal, the clock controller 115 may change the current swallow pattern being used by the ramp circuit 410 to the next swallow pattern shown in FIG. 14 in the downward direction (indicated by the downward arrow in FIG. 14). For example, if the current swallow pattern corresponds to PID 1, the clock controller 115 may change the ramp circuit 410 to the swallow pattern corresponding to PID 2.

If the measured temperature falls below the temperature threshold, the temperature controller 1310 may command the clock controller 115 to increase the frequency of the output clock signal Clk_out. In response, the clock controller 115 may change the current swallow pattern to the next swallow pattern shown in FIG. 14 in the upward direction (indicated by the upward arrow in FIG. 14). For example, if the current swallow pattern corresponds to PID 3, the clock controller 115 may change the ramp circuit 410 to the swallow pattern corresponding to PID 2.

Thus, the clock controller 115 may change the swallow pattern of the ramp circuit 410 to reduce or increase the frequency of the output clock signal under the control of the temperature controller 1310. It is to be appreciated that the swallow patterns shown in FIG. 14 are exemplary only. For example, swallow patterns may be defined using a larger number of bits. This increases the number of possible swallow patterns that may be used by the ramp circuit 410, and hence allows the clock controller to adjust the frequency of the output clock signal with finer granularity.

In one aspect, the clock controller 115 may skip one or more swallow patterns for a given input clock frequency (i.e., frequency of input clock signal sourcing the output clock signal). This is because, for a given input clock frequency, a particular swallow pattern may result in an output clock frequency that excites the resonance of the PDN and/or causes emissions that interference with one or more components (e.g., receiver). For example, if the swallow pattern corresponding to PID 2 results in an output clock signal that excites the resonance of the PDN for input clock signal Clk_a, the clock controller 115 may skip this swallow pattern during thermal mitigation when the output clock signal is sourced by input clock signal Clk_a.

A swallow pattern that is skipped for thermal mitigation for a given input clock signal may be used for ramp down or ramp up during clock switching for the given input clock signal. This is because the output clock signal may stay at a frequency that excites PDN resonance for a much shorter period of time during ramp down or ramp up, and therefore may be less of concern for ramp down or ramp up.

In one embodiment, the clock controller 115 may receive a request to switch input clock signals during thermal mitigation. More particularly, the clock controller 115 may receive a request from the processor 110 to switch the output clock from a current one of the input clock signals Clk_a to Clk_d to a new one of the input clock signals while the clock controller 115 is scaling (throttling) the frequency of the output clock signal due to thermal mitigation. At the time the request is received, the ramp circuit 410 may be swallowing clock pulses according to a swallow pattern corresponding to a PID set by the temperature controller 1310 instead of PID 0. In this case, the clock controller 115 may ramp down the output clock signal starting at the swallow pattern currently set by the temperature controller 1310 instead of PID 0.

Thus, the ramp down sequence for the current input clock signal may start at the swallow pattern corresponding to the PID currently set by the temperature controller 1310. In other words, the ramp down sequence may start at the output clock frequency currently set by the temperature controller 1310 instead of starting at full frequency (i.e., frequency of current input clock signal). For example, if the swallow pattern currently set by the temperature controller 1310 corresponds to PID 2, the clock controller 115 may ramp down the output clock signal starting at the swallow pattern corresponding to PID 2. Using the example in FIG. 10, if the current input clock signal is input clock signal Clk_c, then the ramp down sequence is PID 2→PID4→PID5→PID6→PID7 instead of PID 0→PID4→PID5→PID6→PID7 for the case without thermal mitigation. If the current input clock signal is input clock signal Clk_b, then the ramp down sequence is PID 2→PID 3→PID4→PID5→PID6→PID7 instead of PID 0→PID 2→PID 3→PID4→PID5→PID6→PID7 for the case without thermal mitigation.

After switching to the new input clock signal, the ramp up sequence for the new input clock signal may end at the swallow pattern corresponding to the PID currently set by the temperature controller 1310 instead of PID 0 (which corresponds to full frequency). For example, if the swallow pattern currently set by the temperature controller 1310 corresponds to PID 2, the clock controller 115 may ramp up the output clock signal to the swallow pattern corresponding to PID 2. Using the example in FIG. 10, if the current input clock signal is input clock signal Clk_a, then the ramp up sequence is PID 7→PID 6→PID 5→PID 4→PID 3→PID 2 instead of PID 7→PID 6→PID 5→PID 4→PID 3→PID 2→PID 1→PID 0 for the case without thermal mitigation.

In the above embodiment, the starting swallow pattern for ramp down is the same as the ending swallow pattern for ramp up. This may be done to simplify implementation of the temperature controller 1310. In another embodiment, the ending swallow pattern for ramp up may be different since the same swallow pattern may correspond to different output clock frequencies for different input clock frequencies. In this embodiment, the clock controller 115 may include a clock table in memory that maps PIDs for the current input clock signal to PIDs for the new input clock signal. For example, if the current input clock signal has a frequency of 2 GHz and the new input clock signal has a frequency of 1 GHz, then the table may map PID 6 for the current input clock signal to PID 4 for the new input clock signal. This is because 25% of 2 GHz is approximately equal to 50% of 1 GHz. In this example, the clock table may also map PID 2 for the current input clock signal to PID 0 for the new input clock signal.

In this embodiment, when the clock controller 115 receives a request to switch the output clock from the current input clock signal to the new input clock signal during thermal mitigation, the clock controller 115 may ramp down the frequency of the output clock signal starting at the swallow pattern currently set by the temperature controller 1310 instead of PID 0. The clock controller 115 may also determine the PID for the new input clock signal that maps to the PID for the current input clock signal set by the temperature controller 1310 using the clock table. The clock controller 115 may then enable output of the new input clock signal, and ramp up the frequency of the output clock signal to the mapped PID. Thus, in this example, the PID set by the temperature controller 1310 is updated when the multiplexer 120 switches input clock signals to account for frequency differences between the input clock signals.

In one embodiment, a different set of swallow patterns may be used for temperature mitigation than for frequency ramp down/up for clock switching. In this embodiment, the set of swallow patterns used for temperature mitigation may have corresponding PIDs and the set of swallow patterns used for frequency ramp down/up may have corresponding PIDs. The clock controller 115 may include a link table that maps PIDs for temperature mitigation to PIDs for frequency ramp down/up. For example, a PID for temperature mitigation may be mapped to a PID for ramp down/up that corresponds to a similar percentage of clock pulse swallows.

In this embodiment, when the clock controller 115 receives a request to switch input clock signals during thermal mitigation, the clock controller 115 may map the current PID set by the temperature controller 1310 to the corresponding PID for ramp down/up using the link table. The clock controller 115 may then ramp down the output clock signal starting at the swallow pattern corresponding to the mapped PID. Thus, the ramp down sequence for the current input clock signal may start at the swallow pattern corresponding to the mapped PID (i.e., the PID for ramp down/up corresponding to the PID for thermal mitigation currently set by the temperature controller 1310).

When the output clock signal is enabled with the new input clock signal, the clock controller 115 may ramp up the output clock signal to the swallow pattern corresponding to the mapped PID. Thus, the ramp up sequence for the new input clock signal may end at the swallow pattern corresponding to the mapped PID. The clock signal controller 115 may then continue thermal mitigation at the swallow pattern set by the temperature controller 1310 (i.e., PID currently set by the temperature controller 1310).

In one embodiment, the clock controller 115 may also update the PID for thermal mitigation when switching input clock signals using the clock table discussed above. In this embodiment, when the clock controller 115 receives a request to switch input clock signals during thermal mitigation, the clock controller 115 may map the current PID set by the temperature controller 1310 to the corresponding PID for ramp down/up using the link table. The PID for ramp down/up corresponding to the PID for thermal mitigation currently set by the temperature controller 1310 may be referred to as the start PID for ramp down. The clock controller 115 may then ramp down the output clock signal starting at the swallow pattern corresponding to the start PID.

The clock controller 115 may also determine the PID for the new input clock signal that maps to the start PID for the current input clock signal using the clock table. The PID for the new input clock signal that maps to the start PID for the current input clock signal may be referred to as the end PID for ramp up. The clock controller 115 may also determine the PID for thermal mitigation that maps to the end PID using the link table.

When the output clock signal is enabled with the new input clock signal, the clock controller 115 may ramp up the output clock signal to the swallow pattern corresponding to the end PID. Thus, the ramp up sequence for the new input clock signal may end at the swallow pattern corresponding to the end PID. The clock signal controller 115 may then continue thermal mitigation at the PID for thermal mitigation corresponding to the end PID (i.e., the PID for thermal mitigation that maps to the end PID).

Figure 15:
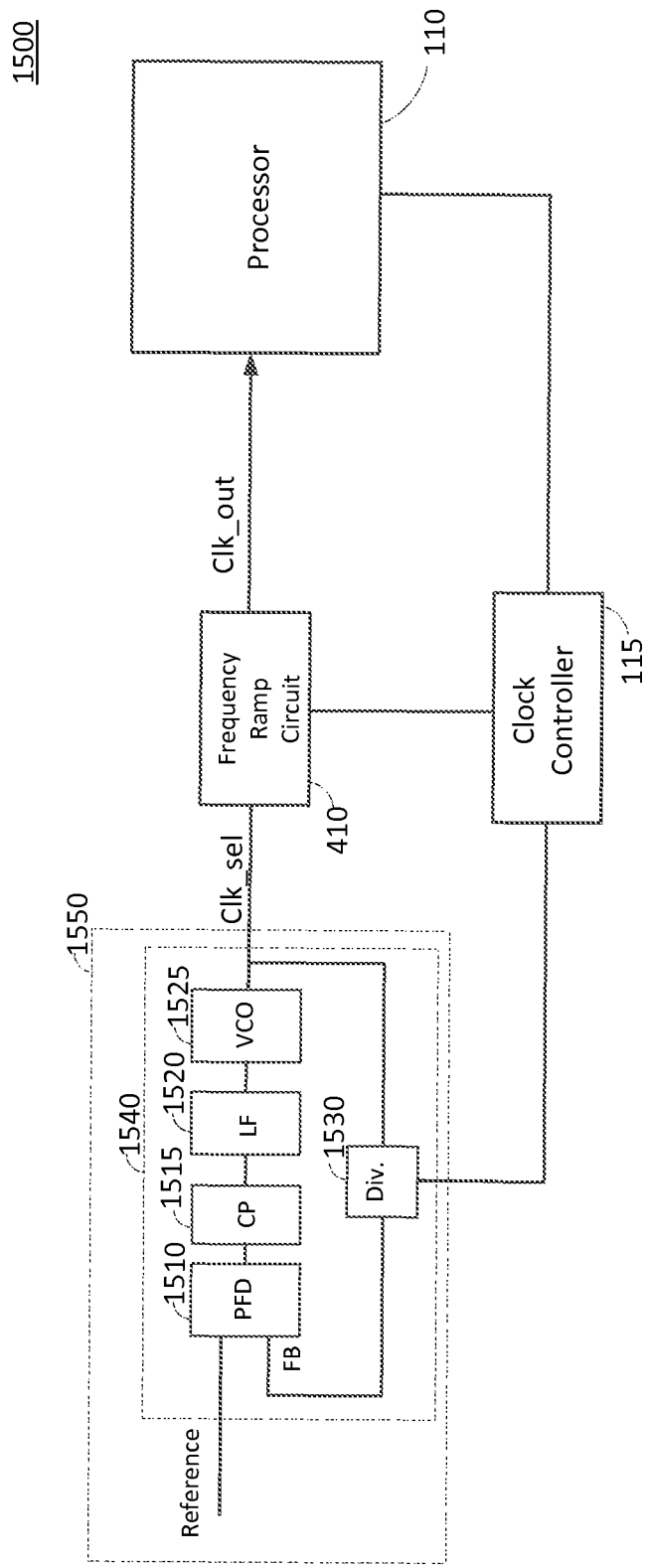
FIG. 15 shows a clock circuit according to an embodiment of the present disclosure.

In the above examples, the clock circuit 140 switches the selected clock signal Clk_sel between a plurality of selectable clock frequencies by using a multiplexer to select between a plurality of input clocks Clk_a to Clk_d having the selectable clock frequencies. However, it is to be appreciated that embodiments of the present disclosure are not limited to this example. In this regard, FIG. 15 shows an example of a system 1500 in which the clock circuit 1550 comprises a PLL 1540 with selectable clock frequencies.

In this example, the PLL 1540 comprises a phase-frequency detector (PFD) 1510, a charge pump 1515, a loop filter 1520, a voltage-controlled oscillator (VCO) 1525, and a feedback frequency divider 1530. The output of the VCO 1525 provides the selected clock signal Clk_sel to the ramp circuit 410. The clock signal Clk_sel is fed back to the PFD

1510 through the frequency divider 1530, which divides the frequency of the clock signal by an adjustable divisor N to produce a feedback signal.

The PFD 1510 receives as inputs the feedback signal and a reference clock signal. The reference clock signal may come from a crystal oscillator or another stable clock source. The PFD 1510 detects the phase difference (error) between the feedback signal and the reference signal, and outputs the detected phase difference (error) to the charge pump 1515. The charge pump 1515 and the loop filter 1520 convert the detected phase difference into a control voltage that controls the frequency of the VCO 140, and hence frequency of the selected clock signal Clk_sel. The control voltage adjusts the frequency of the VCO 1525 in a direction that reduces the phase difference (error) between the reference clock signal and the feedback signal. When the PLL 1540 is locked, the frequency of the clock signal Clk_sel is approximately equal to N times the frequency of the reference clock signal. Thus, the frequency of the clock signal Clk_sel can be adjusted by adjusting the divisor N of the frequency divider 1530.

In this example, the clock controller 115 may switch the clock signal Clk_sel to any one of a plurality of selectable clock frequencies by adjusting the divider N of the frequency divider 1530 accordingly. For instance, the clock controller 115 may switch the selected clock signal Clk_sel from a current selected clock frequency to a new selected clock frequency by changing the divisor N from a divisor value corresponding to the current selected clock frequency to a divisor value corresponding to the new selected clock frequency. In this example, the clock controller 115 may instruct the ramp circuit 410 to ramp down the frequency of the output clock signal Clk_out before the current selected clock frequency is disabled. The ramp circuit 410 may ramp down the frequency of the output clock signal Clk_out by swallowing an increasing percentage of the pulses of the selected clock signal Clk_sel over time or dividing the frequency of the selected clock signal Clk_sel by an increasing amount over time. For the example in which a clock index (e.g., clock index in FIG. 9) is used to determine a ramp down sequence, the clock index may map each of the selectable clock frequencies to one of the PIDs in the index.

After the selected clock signal Clk_sel is switched to the new selected clock frequency, the clock controller 115 may instruct the ramp circuit 410 to ramp up the frequency of the output clock signal Clk_out. The ramp circuit 410 may ramp up the frequency of the output clock signal Clk_out by swallowing a decreasing percentage of the pulses of the selected clock signal Clk_sel over time or dividing the frequency of the selected clock signal Clk_sel by a decreasing amount over time. For the example in which a clock index (e.g., clock index in FIG. 9) is used to determine a ramp up sequence, the clock index may map each of the selectable clock frequencies to one of the PIDs in the index.

In one aspect, the clock circuit 1550 may include a gating circuit (not shown) between the output of the PLL 1540 and the ramp circuit 410. The gating circuit may be configured to gate the output of the PLL for a short time period when the PLL switches from a current selected clock frequency to a new selected clock frequency. The short time period may be used to provide the PLL with enough time to stabilize at the new selected clock frequency before enabling output of the selected clock signal Clk_out at the new selected clock frequency. The short time period, during which the selected clock signal Clk_sel is not output from the clock circuit 1150, is similar to the idle period discussed above. In this aspect, the output clock signal Clk_out may be ramped down and/or ramped up to reduce voltage overshoot and/or voltage droop when the clock circuit 1550 switches clock frequencies.

It is to be appreciated that the clock controller according to any of the embodiments discussed above may be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may perform the functions of the delay controller described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
    a clock circuit configured to output a first clock signal, and to switch the first clock signal from a first clock frequency to a second clock frequency;
    a frequency ramp circuit configured to receive the first clock signal from the clock circuit, to provide a second clock signal based on the first clock signal, and to adjust a frequency of the second clock signal; and
    a clock controller configured to instruct the frequency ramp circuit to ramp down the frequency of the second clock signal before the switch, and to instruct the frequency ramp circuit to ramp up the frequency of the second clock signal after the switch;
    wherein the clock circuit comprises a multiplexer configured to receive a plurality of input clock signals, to select one of the input clock signals, and to output the selected one of the input clock signals as the first clock signal.

2. The system of claim 1, wherein the frequency ramp circuit is configured to adjust the frequency of the second clock signal by selectively swallowing pulses of the first clock signal.

3. The system of claim 2, wherein the frequency ramp circuit is configured to ramp down the frequency of the second clock signal in a plurality of steps by swallowing a higher percentage of pulses of the first clock signal in each subsequent step of the plurality of steps.

4. The system of claim 1, wherein the frequency ramp circuit is configured to adjust the frequency of the second clock signal by dividing a frequency of the first clock signal.

5. The system of claim 4, wherein the frequency ramp circuit is configured to ramp down the frequency of the second clock signal in a plurality of steps by dividing the frequency of the first clock signal by a larger amount in each subsequent step of the plurality of steps.

6. The system of claim 1, wherein the second clock signal is provided to a processor, and the clock controller is configured to instruct the frequency ramp circuit to ramp down the frequency of the second clock signal in response to the processor executing a wait-for-interrupt (WFI) instruction or a wait-for-event (WFE) instruction.

7. The system of claim 1, wherein the clock circuit comprises a multiplexer configured to receive a plurality of inputs clock signals, to select one of the input clock signals, and to output the selected one of the input clock signals as the first clock signal.

8. The system of claim 1, wherein the clock circuit is configured to switch the first clock signal from a first clock frequency to a second clock frequency, and the clock controller is configured to instruct the ramp circuit to ramp down the frequency of the second clock signal before the switch.

9. The system of claim 8, wherein the clock controller is configured to instruct the ramp circuit to ramp up the frequency of the clock signal after the switch.

10. The system of claim 9, wherein the frequency ramp circuit is configured to ramp up the frequency of the second clock signal in a plurality of steps by swallowing a smaller percentage of pulses of the first clock signal in each subsequent step of the plurality of steps.

11. The system of claim 9, wherein the frequency ramp circuit is configured to ramp up the frequency of the second clock signal in a plurality of steps by dividing a frequency of the first clock signal by a smaller amount in each subsequent step of the plurality of steps.

12. The system of claim 1, wherein the second clock signal is provided to a processor, and the clock controller is configured to instruct the frequency ramp circuit to ramp down the frequency of the second clock signal in response to an indication that the processor is to transition from an active mode to an idle mode.

13. The system of claim 12, further comprising a gate circuit configured to gate the second clock signal after ramp down of the frequency of the second clock signal.

14. The system of claim 13, wherein the gate circuit is configured to un-gate the second clock signal when the processor is to be placed back in the active mode, and the clock controller is configured to instruct the ramp circuit to ramp up the frequency of the second clock signal after the second clock signal is un-gated.

15. A method for clock frequency switching, comprising:
ramping down a frequency of a second clock signal, wherein the second clock signal is provided from a first clock signal;
disabling the second clock signal;
switching the first clock signal from a first clock frequency to a second clock frequency after the second clock signal is disabled;
enabling the second clock signal after the first clock signal is switched to the second clock frequency; and
ramping up the frequency of the second clock signal.

16. The method of claim 15, wherein ramping down the frequency of the second clock signal comprises swallowing an increasing percentage of pulses of the first clock signal over time.

17. The method of claim 15, wherein ramping down the frequency of the second clock signal comprises dividing a frequency of the first clock signal by an increasing amount over time.

18. The method of claim 15, wherein ramping up the frequency of the second clock signal comprises swallowing a decreasing percentage of pulses of the first clock signal over time.

19. The method of claim 15, wherein ramping up the frequency of the second clock signal comprises dividing a frequency of the first clock signal by a decreasing amount over time.

20. The method of claim 15, wherein the second clock signal is input to a processor, and wherein ramping down the frequency of the second clock signal is performed in response to a request from the processor to switch from the first clock frequency to the second clock frequency.

21. An apparatus for clock frequency switching, comprising:
means for ramping down a frequency of a second clock signal, wherein the second clock signal is provided from a first clock signal;
means for disabling the second clock signal;
means for switching the first clock signal from a first clock frequency to a second clock frequency after the second clock signal is disabled;
means for enabling the second clock signal after the first clock signal is switched to the second clock frequency; and
means for ramping up the frequency of the second clock signal.

22. The apparatus of claim 21, wherein the means for ramping down the frequency of the second clock signal comprises means for swallowing an increasing percentage of pulses of the first clock signal over time.

23. The apparatus of claim 21, wherein the means for ramping down the frequency of the second clock signal comprises means for dividing a frequency of the first clock signal by an increasing amount over time.

24. The apparatus of claim 21, wherein the means for ramping up the frequency of the second clock signal comprises means for swallowing a decreasing percentage of pulses of the first clock signal over time.

25. The apparatus of claim 21, wherein the means for ramping up the frequency of the second clock signal comprises means for dividing a frequency of the first clock signal by a decreasing amount over time.

26. The apparatus of claim 21, wherein the second clock signal is input to a processor, and wherein the means for ramping down the frequency of the second clock signal ramps down the frequency of the second clock signal in response to a request from the processor to switch from the first clock frequency to the second clock frequency.

* * * * *

UNITED STATES PATENT AND TRADEMARK OFFICE
CERTIFICATE OF CORRECTION

PATENT NO.        : 9,778,676 B2
APPLICATION NO.   : 14/817057
DATED             : October 3, 2017
INVENTOR(S)       : Dipti Ranjan Pal et al.

It is certified that error appears in the above-identified patent and that said Letters Patent is hereby corrected as shown below:

In the Claims

Column 23, Line 5, cancel the text beginning with "7. The system of claim 1" and ending with "the first clock signal." in Column 23, Line 9, and insert the following claim:
--7. The system of claim 1, wherein the frequency ramp circuit is configured to ramp up the frequency of the second clock signal in a plurality of steps by swallowing a smaller percentage of pulses of the first clock signal in each subsequent step of the plurality of steps.--

Column 23, Line 10, cancel the text beginning with "8. The system of claim 1" and ending with "switch." in Column 23, Line 15, and insert the following claim:
--8. The system of claim 1, wherein the frequency ramp circuit is configured to ramp up the frequency of the second clock signal in a plurality of steps by dividing a frequency of the first clock signal by a smaller amount in each subsequent step of the plurality of steps.--

Column 23, Line 16, cancel the text beginning with "9. The system of claim 8" and ending with "after the switch." in Column 23, Line 18, and insert the following claim:
--9. The system of claim 1, wherein the second clock signal is provided to a processor, and the clock controller is configured to instruct the frequency ramp circuit to ramp down the frequency of the second clock signal in response to an indication that the processor is to transition from an active mode to an idle mode.--

Column 23, Line 19, cancel the text beginning with "10. The system of claim 9" and ending with "the plurality of steps." in Column 23, Line 23, and insert the following claim:
--10. The system of claim 9, further comprising a gate circuit configured to gate the second clock signal after ramp down of the frequency of the second clock signal.--

Signed and Sealed this
Fourteenth Day of January, 2020

Andrei Iancu
*Director of the United States Patent and Trademark Office*

CERTIFICATE OF CORRECTION (continued)
U.S. Pat. No. 9,778,676 B2

Column 23, Line 24, cancel the text beginning with "11. The system of claim 9" and ending with "the plurality of steps." in Column 23, Line 28, and insert the following claim:
--11. The system of claim 10, wherein the gate circuit is configured to un-gate the second clock signal when the processor is to be placed back in the active mode, and the clock controller is configured to instruct the ramp circuit to ramp up the frequency of the second clock signal after the second clock signal is un-gated.--

Column 23, Line 29, cancel the text beginning with "12. The system of claim 1" and ending with "an idle mode." in Column 23, Line 34, and insert the following claim:
--12. The system of claim 1, wherein the frequency ramp circuit is configured to ramp down the frequency of the second clock signal from the first clock frequency, and to ramp up the frequency of the second clock signal to the second clock frequency.--

Column 23, Line 35, cancel the text beginning with "13. The system of claim 12" and ending with "the second clock signal." in Column 23, Line 37, and insert the following claim:
--13. The system of claim 1, wherein a first one of the input clock signals corresponds to the first clock frequency and a second one of the input clock signals corresponds to the second clock frequency, and the clock circuit further comprises:
   control logic configured to switch the first clock signal from the first clock frequency to the second clock frequency by outputting an unselect signal for unselecting the first one of the input clock signals, and outputting a select signal for selecting the second one of the input clock signals;
   a first synchronizer configured to receive the unselect signal and the first one of the input clock signals, to synchronize the unselect signal with the first one of the input clock signals, and to output the synchronized unselect signal to the multiplexer, wherein the multiplexer unselects the first one of the input clock signals in response to the synchronized unselect signal; and
   a second synchronizer configured to receive the select signal and the second one of the input clock signals, to synchronize the select signal with the second one of the input clock signals, and to output the synchronized select signal to the multiplexer, wherein the multiplexer selects the second one of the input clock signals in response to the synchronized select signal.--

Column 23, Line 38, cancel the text beginning with "14. The system of claim 13" and ending with "un-gated." in Column 23, Line 43, and insert the following claim:
--14. The system of claim 1, wherein:
   the frequency ramp circuit is configured to adjust the frequency of the second clock signal by selectively swallowing pulses of the first clock signal;
   one of the input clock signals corresponds to the first clock frequency;
   the system further comprises a memory storing a plurality of ramp down sequences, each one of the ramp down sequences specifying a sequence of pulse swallow patterns for a respective one of the input clock signals; and
   the clock controller is configured to retrieve, from the memory, the ramp down sequence specifying the sequence of pulse swallow patterns for the one of the input clock signals corresponding to the first clock frequency, and to instruct the ramp circuit to ramp

CERTIFICATE OF CORRECTION (continued)
U.S. Pat. No. 9,778,676 B2 down the frequency of the second clock signal according to the retrieved ramp down sequence.--

Column 23, Line 44, cancel the text beginning with "15. A method" and ending with "the second clock signal." in Column 23, Line 54, and insert the following claim:
--15. A method for clock frequency switching, comprising:
    receiving a plurality of input clock signals;
    selecting one of the plurality of input clock signals using a multiplexer;
    outputting the selected one of the plurality of input clock signals as a first clock signal;
    ramping down a frequency of a second clock signal, wherein the second clock signal is provided from the first clock signal;
    disabling the second clock signal;
    switching the first clock signal from a first clock frequency to a second clock frequency after the second clock signal is disabled;
    enabling the second clock signal after the first clock signal is switched to the second clock frequency; and
    ramping up the frequency of the second clock signal.--

Column 24, Line 19, cancel the text beginning with "21. An apparatus" and ending with "signal." in Column 24, Line 33, and insert the following claim:
--21. An apparatus for clock frequency switching, comprising:
    means for receiving a plurality of input clock signals;
    means for selecting one of the plurality of input clock signals;
    means for outputting the selected one of the plurality of input clock signals as a first clock signal;
    means for ramping down a frequency of a second clock signal, wherein the second clock signal is provided from the first clock signal;
    means for disabling the second clock signal;
    means for switching the first clock signal from a first clock frequency to a second clock frequency after the second clock signal is disabled;
    means for enabling the second clock signal after the first clock signal is switched to the second clock frequency; and
    means for ramping up the frequency of the second clock signal.--